US012033578B1

(12) United States Patent
Li et al.

(10) Patent No.: US 12,033,578 B1
(45) Date of Patent: Jul. 9, 2024

(54) DRIVING METHOD OF DISPLAY PANEL, AND DISPLAY DEVICE

(71) Applicants: Wuhan Tianma Micro-Electronics Co., Ltd., Wuhan (CN); Wuhan Tianma MicroElectronics Co., Ltd. Shanghai Branch, Shanghai (CN)

(72) Inventors: Yue Li, Wuhan (CN); Peng Zhang, Wuhan (CN); Mengmeng Zhang, Wuhan (CN); Xueqi Tian, Wuhan (CN); Shuai Yang, Wuhan (CN); Yana Gao, Wuhan (CN); Gaojun Huang, Wuhan (CN)

(73) Assignees: WUHAN TIANMA MICRO-ELECTRONICS CO., LTD., Wuhan (CN); WUHAN TIANMA MICROELECTRONICS CO., LTD. SHANGHAI BRANCH, Shanghai (CN)

( * ) Notice: Subject to any disclaimer, the term of this patent is extended or adjusted under 35 U.S.C. 154(b) by 0 days.

(21) Appl. No.: 18/195,621

(22) Filed: May 10, 2023

(30) Foreign Application Priority Data

Jan. 4, 2023 (CN) ......................... 202310015555.2

(51) Int. Cl.
*G09G 3/3233* (2016.01)

(52) U.S. Cl.
CPC ... *G09G 3/3233* (2013.01); *G09G 2300/0842* (2013.01); *G09G 2310/061* (2013.01); *G09G 2320/0247* (2013.01)

(58) Field of Classification Search
CPC ......... G09G 3/3233; G09G 2300/0842; G09G 2310/061; G09G 2320/0247
See application file for complete search history.

(56) References Cited

U.S. PATENT DOCUMENTS

| | | | | |
|---|---|---|---|---|
| 11,538,412 | B1 * | 12/2022 | Zhang | G09G 3/3233 |
| 11,756,482 | B2 * | 9/2023 | Han | G09G 3/3233 345/212 |
| 2019/0057646 | A1 * | 2/2019 | Lin | G09G 3/3233 |
| 2021/0104196 | A1 * | 4/2021 | Yuan | G09G 3/3258 |
| 2021/0375193 | A1 * | 12/2021 | Son | G09G 3/3233 |
| 2021/0407384 | A1 * | 12/2021 | Yuan | G09G 3/32 |

FOREIGN PATENT DOCUMENTS

| | | | |
|---|---|---|---|
| CN | 111710300 | B | 9/2020 |
| CN | 112802431 | A | 5/2021 |
| CN | 113012643 | A | 6/2021 |
| CN | 115527487 | A | 12/2022 |

* cited by examiner

*Primary Examiner* — Grant Sitta
(74) *Attorney, Agent, or Firm* — Anova Law Group, PLLC

(57) ABSTRACT

A driving method of a display panel and a display panel are provided. Time for displaying one frame includes N times of first node potential adjustment stages, a data writing stage, and at least one first bias stress stage; the data writing stage is after the first node potential adjustment stage and before the first bias stress stage; the N times first node potential adjustment stage include N reset stages and N first adjustment voltage writing stages; and an i-th first voltage writing stage is after an i-th reset stage. In the reset stage, the first reset module is turned on to write a reset signal to the first node; in the first adjustment voltage writing phase, the first reset module is turned off, and the compensation module is turned on to write a first adjustment voltage into the first node to adjust the bias state of the driving transistor.

19 Claims, 9 Drawing Sheets

DRIVING METHOD OF DISPLAY PANEL, AND DISPLAY DEVICE

CROSS-REFERENCE TO RELATED APPLICATION

This application claims the priority of Chinese Patent Application No. 202310015555.2, filed on Jan. 4, 2023, the content of which is incorporated by reference in its entirety.

TECHNICAL FIELD

The present disclosure generally relates to the field of display technologies and, more particularly, relates to a driving method of a display panel and a display device.

BACKGROUND

Organic light-emitting display devices have the advantages of self-luminescence, low driving voltage, high luminous efficiency, fast response speed, thinness, and high contrast, and are considered to be the most promising display devices for the next generation. Organic light-emitting display devices are more and more widely used in other display devices with display functions such as mobile phones, computers, televisions, vehicle-mounted display devices, or wearable devices.

A pixel in an organic light-emitting display device includes a pixel driving circuit. A driving transistor in the pixel driving circuit can generate a driving current, and a light-emitting element emits light in response to the driving current. The driving current generated by the driving transistor is related to the gate potential of the driving transistor.

Due to the characteristics of the driving transistor itself, during the screen switching process of the display device, the driving transistor will be affected by the data of the previous frame of the screen, resulting in that the display screen cannot be quickly switched to the preset screen, flickering occurs, and the display effect is affected. The present disclosed driving methods of a display panel and display panels are direct to solve one or more problems set forth above and other problems in the arts.

SUMMARY

One aspect of the present disclosure provides a driving method of display panel. The driving method includes providing the display panel. The display panel includes a light-emitting element and a pixel circuit connected to the light-emitting element, the pixel circuit includes a first reset module, a data writing module, a compensation module and a driving transistor, a control terminal of the driving transistor is connected to a first node, time for the display panel to display one frame includes N times of first node potential adjustment stages, a data writing stage and at least a first bias stress stage performed before the light-emitting stage, the data writing stage is after the N times of first node potential adjustment stages and before the first bias stress stage, the N times of first node potential adjustment stages includes N reset stages and N first adjustment voltage writing stages, an i-th first adjustment voltage writing stage is after an i-th reset stage, 1≤i≤N, i is an integer, and N is an integer greater than or equal to one. The driving method also includes, in the reset stage, turning on the first reset module, and writing a reset signal to the first node using the first reset module; in the first adjustment voltage writing stage, turning off the first reset module, turning on the compensation module, and writing a first adjustment voltage into the first node to adjust a bias state of the driving transistor; in the data writing stage, turning on the data writing module and the compensation module, and writing data signals using the data writing module; in the first bias stress stage, turning off the compensation module, and writing a second adjustment voltage into a source or a drain of the driving transistor to adjust the bias state of the driving transistor; and in the light-emitting stage, generating a driving current to drive the light-emitting element to emit light using the driving transistor.

Another aspect of the present disclosure provides a display panel. The display panel includes a light-emitting element and a pixel circuit connected to the light-emitting element. The pixel circuit includes a first reset module, a data writing module, a compensation module and a driving transistor; a control terminal of the driving transistor is connected to a first node; time for the display panel to display one frame includes N times of first node potential adjustment stages, a data writing stage, and at least one first bias stress stage performed before the light-emitting stage; the data writing stage is after the N times of first node potential adjustment stages and before the first bias stress stage; the first node potential adjustment stage includes N reset stages and N first adjustment voltage writing stages; an i-th first voltage writing stage is after an i-th reset stage; 1≤i≤N, i is an integer, and N is an integer greater than or equal to 1. The display panel is driven by, in the reset stage, turning on the first reset module, and writing a reset signal to the first node using the first reset module; in the first adjustment voltage writing stage, turning off the first reset module, turning on the compensation module, and writing a first adjustment voltage into the first node to adjust a bias state of the driving transistor; in the data writing stage, turning on the data writing module and the compensation module, and writing data signals using the data writing module; in the first bias stage, turning off the compensation module is turned off, and writing a second adjustment voltage into a source or a drain of the driving transistor to adjust the bias state of the driving transistor; and in the light-emitting stage, generating a driving current to drive the light-emitting element to emit light using the driving transistor.

Other aspects of the present disclosure can be understood by those skilled in the art in light of the description, the claims, and the drawings of the present disclosure.

BRIEF DESCRIPTION OF THE DRAWINGS

To illustrate the technical solutions in the embodiments of the present disclosure more clearly, the following briefly introduces the accompanying drawings used in the description of the embodiments. Obviously, the accompanying drawings in the following description are only some embodiments of the present disclosure, for those of ordinary skill in the art, other drawings may also be obtained from these drawings without creative effort.

DETAILED DESCRIPTION

The relative arrangements of components and steps, numerical expressions and numerical values set forth in these embodiments do not limit the scope of the present disclosure unless specifically stated otherwise.

The following description of at least one exemplary embodiment is merely illustrative in nature and in no way taken as limiting the disclosure, its application or uses.

Techniques, methods, and devices known to those of ordinary skill in the relevant art may not be discussed in detail, but where appropriate, such techniques, methods and devices should be considered parts of the description.

In all examples shown and discussed herein, any specific values should be construed as exemplary only, and not as limitations. Therefore, other instances of the exemplary embodiment may have different values.

It will be apparent to those skilled in the art that various modifications and variations can be made in the present disclosure without departing from the spirit or scope of the disclosure. Therefore, the present disclosure is intended to cover the modifications and variations of the present disclosure falling within the scope of the corresponding claims (technical solutions to be protected) and their equivalents. It should be noted that, the implementation manners provided in the embodiment of the present disclosure may be combined with each other if there is no contradiction.

It should be noted that like numerals and letters denote like items in the following figures, therefore, once an item is defined in one figure, it does not require further discussion in subsequent figures.

Figure 1:
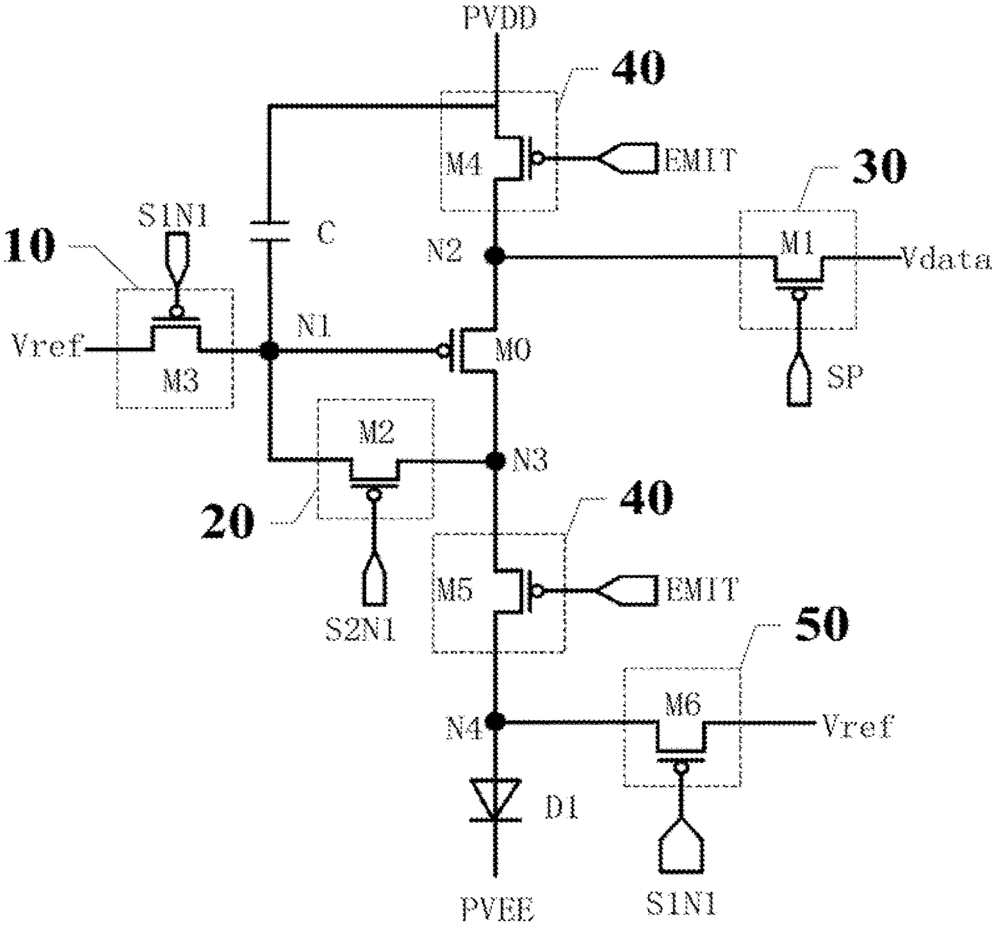
FIG. 1 illustrates a structure of an exemplary driving circuit of a display panel according to various disclosed embodiments of the present disclosure.
Figure 2:
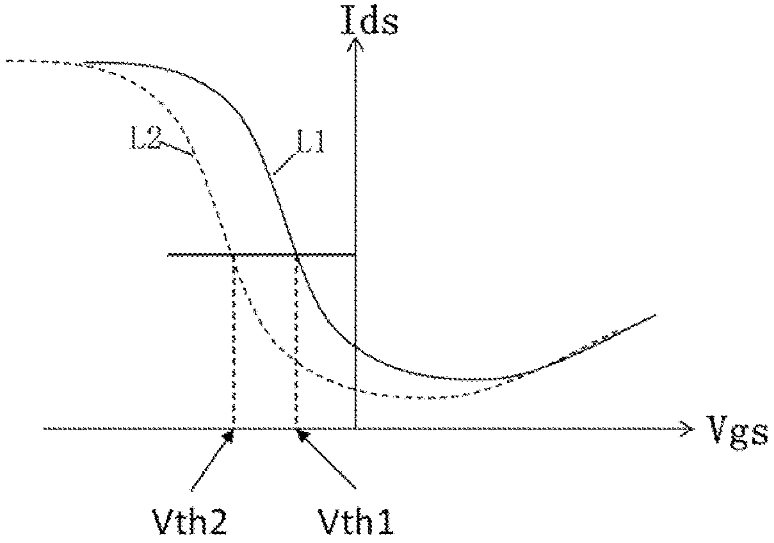
FIG. 2 illustrates an exemplary characteristic curve of a driving transistor under different frames according to various disclosed embodiments of the present disclosure.

FIG. 1 is a schematic structural diagram of an exemplary driving circuit of a display panel according to various disclosed embodiments of the present disclosure. FIG. 2 illustrates an exemplary characteristic curve of a driving transistor at different frames. The configuration that the first terminal of the driving transistor is the source, the second terminal of the driving transistor is the drain, and the control terminal of the driving transistor is the gate is used as an example for introduction. When the pixel circuit cycle is in periodically displaying, in the non-bias stage such as the non-light-emitting stage, there may be situations where the gate potential of the driving transistor is greater than the drain potential of the driving transistor. If this situation is set for a long time, the ions inside the driving transistor may be polarized, resulting in the continuous increase of the threshold voltage of the transistor, and causing the shift of Ids-Vgs curve. Thus, the driving current flowing into the light-emitting element may be affected, and the display uniformity may be affected. In the related art, during the screen switching process, the characteristic curve of the driving transistor will be affected by the previous frame of screen data, and the driving current corresponding to the preset switching screen cannot be generated, resulting in that the display screen cannot be quickly switched to the preset switching screen. For example, before switching from a black picture to a white picture, a gray picture between the black picture and the white picture appears, and the picture flickers, which affects the display effect.

The present disclosure provides a method for driving a display panel and a display device. The display panel may include a light-emitting element and a pixel circuit connected to the light-emitting element. The pixel circuit may include a first reset module, a data writing module, a compensation module, and a driving transistor. The control terminal of the driving transistor may be connected to a first node. The time for the display panel to display one frame may include N times of the first node potential adjustment stages performed before the light-emitting stage, a data writing stage, and at least one first bias stress stage. The data writing stage may be after the N times of first node potential adjustment stages and before the first bias stress stage. N times of first node potential adjustment stages may include N time of reset stage and N times of first voltage writing stage. The i-th first adjustment voltage writing stage after the i-th reset stage, $1 \leq i \leq N$, i may be an integer, and N may be an integer greater than or equal to 1. In the reset stage, the first reset module may be turned on, and the first reset module may write a reset signal to the first node. In the first adjustment potential writing stage, the first reset module may be turned off, the compensation module may be turned on, and the first adjustment voltage may be written to the first node, which may be used to adjust the bias state of the driving transistor. In the data writing stage, the data writing module and the compensation module may be turned on, and the data writing module may write the data signal. In the first bias stress stage, the compensation module may be turned off, and the second adjustment voltage may be written to the source or the drain of the driving transistor to adjust the bias voltage of the driving transistor and the bias state of the driving transistor may be adjusted. In the light-emitting stage, the driving transistor may generate a driving current to drive the light-emitting element to emit light. By introducing the first node potential adjustment stage before the data writing stage and introducing the first bias stress stage after the data writing stage and before the light-emitting stage, the adjustment of the bias state of the driving transistor may be realized before the light-emitting stage, the threshold voltage drift phenomenon of the driving transistor may be reduced. Accordingly, the display screen generated in the light-emitting stage is more consistent with the preset switching screen, which may be more conducive to reducing the flicker phenomenon that occurs during the screen switching process, and may be more conducive to improving the display effect.

The above is the core idea of the present disclosure, and the technical solutions in the embodiments of the present disclosure will be clearly and completely described below in conjunction with the accompanying drawings in the embodiments of the present disclosure. Based on the embodiments of the present disclosure, all other embodiments obtained by persons of ordinary skill in the art without creative work belong to the protection scope of the embodiments of the present disclosure.

Figure 3:
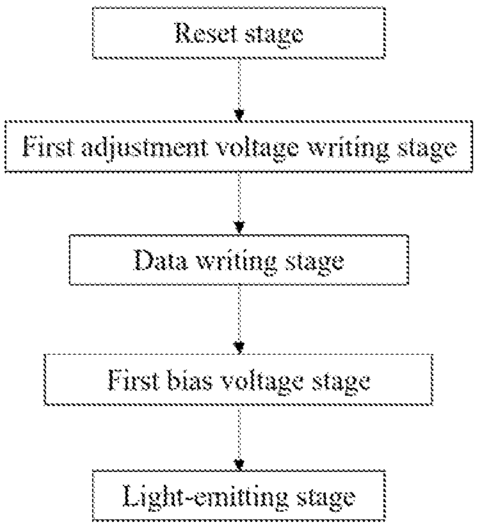
FIG. 3 illustrates a flow chart of an exemplary driving method of a display panel according to various disclosed embodiments of the present disclosure.
Figure 4:
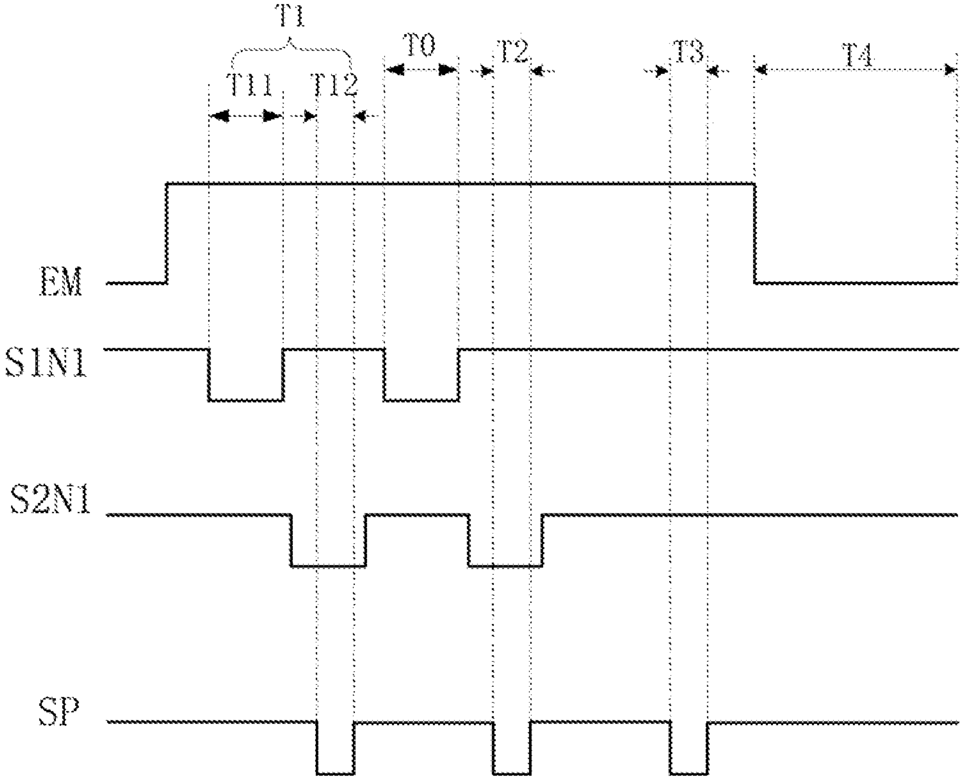
FIG. 4 illustrates a time sequence of an exemplary driving method of a display panel according to various disclosed embodiments of the present disclosure.

FIG. 3 is a flow chart of an exemplary driving method of the display panel according to various disclosed embodiments of the present disclosure, and FIG. 4 is a time sequence of an exemplary driving method of a display panel according to various disclosed embodiments of the present disclosure. As shown in FIG. 3 and FIG. 4 and referring to FIG. 1, for the driving method of the display panel in one embodiment of the present disclosure, the display panel may include a light-emitting element D1 and a pixel circuit connected to the light-emitting element D1. The pixel circuit may include a first reset module 10, a data writing module 30, a compensation module 20 and a driving transistor M0. The control terminal of the driving transistor M0 may be connected to a first node N1.

Time for the display panel to display one frame may include N times of first node potential adjustment stages T1, a data writing stage T2, and at least one first bias stress stage T3 performed before the light-emitting stage T4. The data writing stage T2 may be after the first node potential adjustment stage T1 and before the first bias stress stage T3. The first node potential adjustment stage T1 may include N times of reset stages T11 and N times of first adjustment voltage writing stages T12. An i-th first adjustment voltage writing stage may be after an i-th reset stage T11, and $1 \le i \le N$. i may be an integer, and N may be an integer greater than or equal to 1.

In the reset stage T11, the first reset module 10 may be turned on, and the first reset module 10 may write a reset signal to the first node N1. In the first adjustment voltage writing stage T12, the first reset module 10 may be turned off, and the compensation module 20 may be turned on, a first adjustment voltage may be written to the first node N1 for adjusting the bias state of the driving transistor M0.

In the data writing stage T2, the data writing module 30 and the compensation module 20 may be turned on, and the data writing module 30 may write data signals.

In the first bias stage T3, the compensation module 20 may be turned off, a second adjustment voltage may be written into the source or the drain of the driving transistor M0 to adjust the bias state of the driving transistor M0.

In the light-emitting stage T4, the driving transistor M0 may generate a driving current to drive the light-emitting element D1 to emit light.

It should be noted that, FIG. 1 only illustrates that the pixel circuit includes seven transistors M0-M6 and one capacitor C as an example, but does not limit the structure of the display panel corresponding to the embodiment of the present disclosure. The gate of the driving transistor M0 may be connected to the first node N1, the first terminal of the driving transistor M0 may be connected to the second node N2, and the third terminal of the driving transistor M0 may be connected to the third node N3. The anode of the light-emitting element D1 may be connected to the fourth node N4, and the second node N2 may be connected to the first voltage signal line PVDD through the light-emitting control module 40, and the cathode of the light-emitting element D1 may be connected to the second voltage signal line PVEE. In one embodiment, the pixel circuit may further include a light-emission control module 40 and a second reset module 50. The second reset module 50 may be used to reset the fourth node N4 of the pixel circuit, and the light-emission control module 40 may be turned on in the light-emission stage T4.

It should also be noted that FIG. 4 only takes the condition that the first node potential adjustment stage T1 may be performed before the light-emitting stage T4 within the time for displaying one frame as an example. For example, the reset stage T11 and the first node potential adjustment stage T1 may be performed once before the light-emitting stage T4. The number of the first node potential adjustment stages T1 performed before the light-emitting stages T4 is not limited, and an embodiment in which the number of the first node potential adjustment stages T1 is other times will be described later.

Specifically, please refer to FIG. 1 to FIG. 4, in the driving method of the display panel provided by the present disclosure, the time for displaying one frame may include N times of first node potential adjustment stages T1 performed before the light-emitting stage T4, one data writing stage T2, and at least one first bias stress stage T3. The first node potential adjustment stage T1 performed before the data writing stage T2 may include N reset stages T11 and N first adjustment voltage writing stages T12. For example, the first node potential adjustment stages T12 executed before the data writing stage T2 may include N times of reset stages T11 and N times of first adjustment voltage writing stages T12. In the reset stage T11, a reset signal may be written to the first node N1 in the driving circuit to reset the gate of the driving transistor M0. In the first adjustment voltage writing stage T12, the compensation module 20 in the driving circuit may be turned on, and the first adjustment voltage may be written into the first node N1. The first adjustment voltage may be used to adjust the bias state of the driving transistor M0, and to realize the control of the driving transistor M0. the threshold compensation and feature restoration. The N times of reset stages T11 and first adjustment voltage writing stages T12 may be performed before the data writing stage T2. For example, before the data writing stage T2, N times of first adjustment voltage writing process may be performed. At this time the driving transistor M0 may be at the on state, and there may be N times of current passing through the driving transistor M0, which may be equivalent to perform an on-state bias for the driving transistor M0 to reduce the hysteresis effect of the driving transistor M0 and restore the characteristics of the driving transistor M0 to the original state as much as possible. By performing so, the driving transistor M0 may not be affected by the picture data of the previous frame, and may still generate the driving current corresponding to the preset switching picture, which may be conducive to quickly switching the picture to the preset switching picture. Accordingly, it may be beneficial to reduce the flicker phenomenon during the image switching process, and the display effect may be improved. Further, the present disclosure may also introduce a first bias stress stage T3 after the data writing stage T2 and before the light-emitting stage T4, and may write the second adjustment voltage to the source or the drain of the driving transistor M0 in the first bias stress stage T3, which may be equivalent to providing a bias voltage to the driving transistor M0 to ensure that the driving transistor M0 may undergo a bias process before the light-emitting stage T4. Accordingly, the threshold characteristics of the driving transistor M0 before the light-emitting stage T4 may tend to be consistent, which may be more conducive to improving the display effect.

In one embodiment, between the last first node potential adjustment stage T1 and the data writing stage T2, at least one reset stage TO may also be included to reset the gate of the driving transistor M0 such that the characteristics of the driving transistor M0 may be restored before the data writing stage T2. Accordingly, the driving transistor M0 may not be affected by the picture data of the previous frame.

Figure 5:
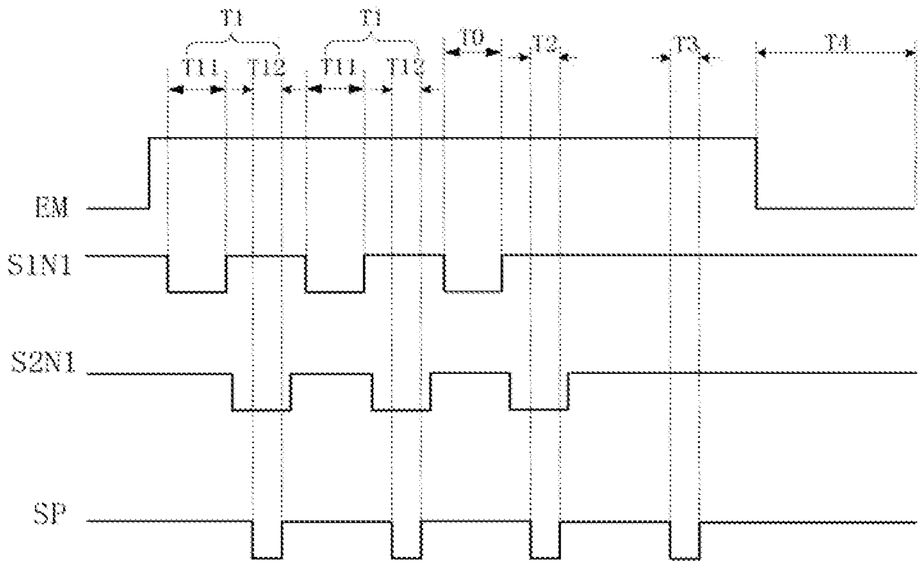
FIG. 5 illustrates another time sequence of an exemplary driving method of a display panel according to various disclosed embodiments of the present disclosure.

FIG. 5 is another time sequence of an exemplary driving method of a display panel provided by one embodiment of the present disclosure. The difference between this embodiment and the embodiment shown in FIG. 4 may include that the times of the first node potential adjustment stages T2 performed in the data writing stage T1 may be different. In this embodiment, the first node potential adjustment stage T1 may be executed twice before the data writing stage T2.

Referring to FIG. 5, in one embodiment of the present disclosure, within one display frame time, the first node potential adjustment stage T1 may be performed at least twice before the data writing stage T2.

The first node potential adjustment stage T1 may be executed twice before the data writing stage T2, specifically, the first adjustment voltage writing stage T12 may be executed after the first reset stage T11, the second reset stage T11 may be performed after the first time first adjustment voltage writing stage T12, and the second time first adjustment voltage writing stage T12 may be performed after the second reset stage T11. For example, after the first reset stage T11, the first adjustment voltage writing stage T12 may be performed, and then the second reset stage T11 and the second time first adjustment voltage writing stage T12 may be performed again.

In one embodiment of the present disclosure, the gate of the driving transistor M0 may be reset through the reset stage T11. The bias state of the driving transistor M0 may be adjusted through the first adjustment voltage writing stage T12, and the threshold compensation for the driving transistor M0 may be realized. The more times the reset state T11 and the first adjustment voltage writing stage T12 are performed before the data writing stage T2, the more beneficial it is to reduce the hysteresis effect caused by the drift of the threshold voltage of the driving transistor M0. Therefore, when two reset stages T11 and two first adjustment voltage writing stages T12 are introduced before the data writing stage T2, it may be more conducive to the recovery of the characteristics of the driving transistor M0 such that the driving transistor M0 may not be affected by the previous frame of the picture data. The driving current corresponding to the preset switching screen may still be generated, which may be beneficial to quickly switch the screen to the preset switching screen. Thus, it may be more conducive to reducing the flickering phenomenon during the screen switching process and improving the display effect.

Figure 6:
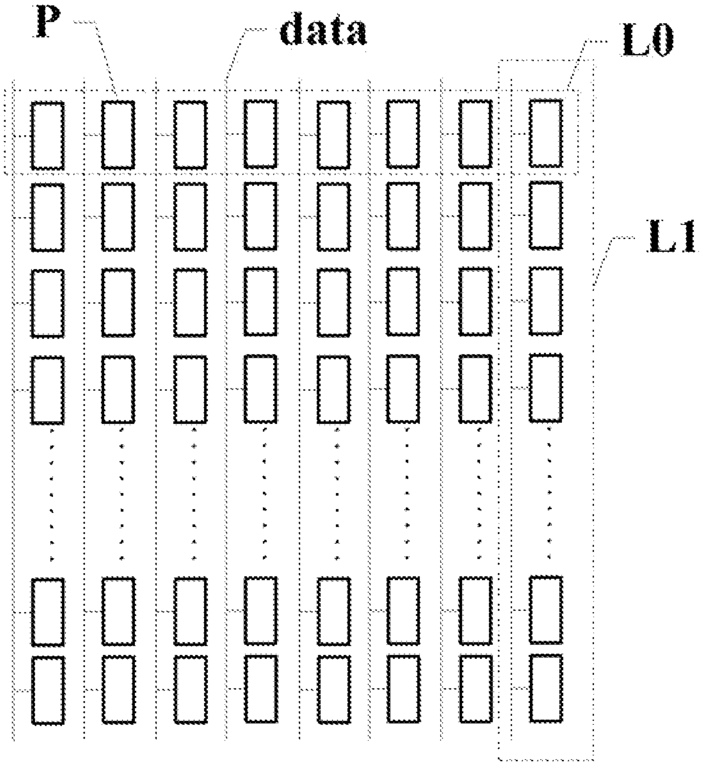
FIG. 6 illustrates an exemplary pixel arrangement of a display panel according to various disclosed embodiments of the present disclosure.

FIG. 6 is a schematic diagram of an exemplary pixel arrangement in a display panel provided by an embodiment of the present disclosure, which shows a connection relationship between sub-pixels and data lines. It should be noted that FIG. 6 only schematically illustrates one arrangement manner of the sub-pixels P, it does not limit the actual arrangement of the sub-pixels P in the display panel, nor does it represent the number and size of the sub-pixels P actually contained in the display panel. As shown in FIG. 6, in one embodiment, the display panel may include multiple pixel-rows L0 and multiple pixel columns L1. Pixel circuits corresponding to at least some sub-pixels in a same pixel column L1 may be connected to the same data line "data". In this embodiment, the configuration that the pixel circuits corresponding to each sub-pixel P in the same pixel column L1 are connected to the same data line "data" is used as an example for illustration. The number of sub-pixels P connected to the same data line "data" in the same pixel column L1 may not be limited. In the data writing stage T2, the data voltage on the data line P may be written into the pixel driving circuit through the data writing module 30.

Referring FIG. 6, in one embodiment of the present disclosure, the display panel may include a plurality of pixel-rows L0, and each pixel-row L0 may include a plurality of sub-pixels P. Referring to FIG. 1, FIG. 4 and FIG. 5, when the sub-pixel in the m-th row and the n-th column performs the first node potential adjustment stage T1, the first adjustment voltage written to the first node N1 may be the data voltage of the sub-pixel in the (m−k)-th row and the n-th column in the pixel-row. $m\geq 2$, $n\geq 1$, $1\leq k<m$, m, n and k may be all integers. That is to say, when the first adjustment voltage writing stage T12 is performed on a certain sub-pixel in the current pixel-row, the first adjustment voltage provided to the sub-pixel may multiplex the data voltage of other previous sub-pixels located in the same column. In such a way, a new voltage signal may not need to be introduced in the display panel, which may be beneficial to simplify the chip design in the display panel.

Further, referring to FIG. 6, in one embodiment of the present disclosure, the display panel may include a plurality of pixel-rows L0, and one pixel-row may include a plurality of sub-pixels P. When the sub-pixel at the m-th row and n-th column perform the first node potential adjustment stage T1, $m\geq 1$, $n\geq 1$, the first adjustment voltage written to the first node N1 may be the data voltage of the sub-pixel in the m-th row n-th column, or the first adjustment voltage written to the first node N1 may be the black state voltage of the display panel.

When the first voltage adjustment stage is performed on a certain sub-pixel, the first adjustment voltage provided to the sub-pixel may multiplex the data voltage of the sub-pixel located in the same column as the sub-pixel and in the previous pixel-row, and the data voltage corresponding to the sub-pixel may also be multiplexed as the first adjustment voltage. The bias state of the driving transistor M0 may be adjusted by writing the data voltage to the gate of the driving transistor M0, while compensating the threshold voltage of recovering the characteristics of the driving transistor M0, it may also be beneficial to simplify the chip design of the display panel.

In some other embodiments of the present disclosure, the black state voltage of the display panel may also be multiplexed as the first adjustment voltage written to the first node N1. By doing so, it may also be unnecessary to introduce a new voltage signal into the display panel, and the adjustment of the bias state of the driving transistor M0 may be realized by utilizing the existing signals in the display panel, and it may also be beneficial to simplify the chip design of the display panel. Moreover, the black state voltage may be a relatively high voltage, and it may be more beneficial to adjust the bias state of the driving transistor M0 when a higher voltage is written into the gate of the driving transistor M0.

In one embodiment of the present disclosure, the display panel may include a normal display mode, a high brighness mode (HDM), and a always on display (AOD) mode, and within one frame of display time, the number of the first node potential adjustment stages T1 of the display panel executed in the AOD mode may be greater than the number of first node potential adjustment stages T1 performed in the normal display mode and the HDM.

Among the three display modes of the display panel, in the AOD mode, due to the low frequency, the phenomenon of the threshold voltage drift of the driving transistor M0 in the pixel circuit may be more obvious when maintaining the frame, that is to say, in the AOD mode, the flickering of the display panel may be more prominent. The present disclosure may introduce the first node potential adjustment stage before the data writing stage, and may introduce the first bias stress stage between the data writing stage and the light-emitting stage to reduce the hysteresis effect of the driving transistor in the pixel circuit and reduce the screen flickering phenomenon. Because the flickering phenomenon of the display screen is more obvious in power-saving mode, when the same number of first node potential adjustment stages are introduced before the data writing stage in normal display mode, HDM and AOD mode, the flickering phenomenon of different display modes may all be reduced under the display mode, but the flickering situation in the AOD mode may be still more obvious than the flickering situation in the other two display modes, that is, the display effects in different display modes may be inconsistent, and there may still room to reduce the flickering in the AOD mode. Thus, in the AOD mode, the present disclosure increases the number of times of the first node potential adjustment stages performed before the data writing stage, for example, in the normal display mode and the HDM, the number of the first node potential adjustment stages performed before the data writing stage may be one, and the driving sequence may be referred to FIG. 4. In the always on display mode, the number of the first node potential adjustment stages executed before the data writing stage may be 2, and the driving sequence may be referred to FIG. 5. The time for recovering the characteristics of the driving transistor in the always on display mode may be extended by differentially designing the number of times of the first node potential adjustment stages performed in the always on display mode and other display modes, which may be beneficial to reduce the flicker phenomenon in the power saving mode, and the consistency of the display effect of the display panel in different display modes may be improved, thereby helping to improve the overall display effect of the display panel.

Referring to FIG. 1, FIG. 4 and FIG. 5, in one embodiment of the present disclosure, in the same first node potential adjustment stage T1, the pulse width of the single effective pulse signal that controls to turn on the first reset module 10 may be greater than or equal to 2H, the pulse width of a single effective pulse signal that controls the compensation module 20 to be turned on may be greater than or equal to 2H, and H is the time required for scanning a row of sub-pixels in the display panel. In the embodiment of FIG. 1, the configuration that the third transistor M3 and the second transistor M2 included in the first reset module 10 and the compensation module 20 are both P-type transistors is used for the illustration. At this time, the effective pulse signal that controls the first reset module 10 and the compensation module 20 may be a low-level signal. When the third transistor M3 and the second transistor M2 are N-type transistors, the signal for controlling the conduction of the first reset module 1 and the compensation module 20 may be a high-level signal.

Further, referring to FIG. 1, FIG. 4 and FIG. 5, in the embodiment of the present disclosure, the effective pulse width of the single reset stage T11 performed before the data writing stage T2 may be set to be greater than or equal to the time required for scanning the two rows of sub-pixels in the display panel, which may be equivalent to prolonging the time for resetting the first node N1, and the longer the time for resetting the first node N1 is, the more favorable it may be for the recovery of the characteristics of the driving transistor M0. In addition, in one embodiment of the present disclosure, the single effective pulse width that controls the compensation module 20 to be turned on before the data writing stage T2 may be set to be greater than or equal to the time required to scan two rows of sub-pixels in the display panel, that is, the time for writing the first adjustment voltage to the first node N1 may be greater than or equal to the time required for scanning two rows of sub-pixels in the display panel. Thus, it may be equivalent to prolonging the time for writing the first adjustment voltage to the first node N1 before the data writing stage T2. The longer the time for writing the first adjustment voltage to the first node N1 is, the more favorable it may be to reduce the hysteresis effect caused by the threshold voltage shift of the driving transistor M0. Therefore, in the embodiment of the present disclosure, by prolonging the time for resetting the first node N1 and writing the first adjustment voltage to the first node N1 before the data writing stage T2, the time for recovering the characteristic of the driving transistor M0 may be prolonged, reducing or avoiding the influence of the picture data of the previous frame on the driving transistor M0, and thus it may be more conducive to reducing the flickering phenomenon during the picture switching process and improving the display effect of the display panel.

Further, referring to FIG. 5, in one embodiment of the present disclosure, when at least two first node potential adjustment stages are introduced before the data writing stage, in the same first node potential adjustment stage T1, the effective pulse signal for controlling the first reset module 10 to be turned on may be a first pulse signal, and the effective pulse signal for controlling the compensation module 20 to be turned on may be the second pulse signal. The interval between two adjacent first pulse signals may be at least 2H, and the interval between two adjacent second pulse signals may be at least 2H, and H may be the time required for scanning a row of sub-pixels in the display panel.

In one embodiment, when the interval between two adjacent first pulse signals is set to be greater than or equal to 2H, enough time may be reserved for turning on the compensation module. Because the first adjustment voltage writing stage may be executed after the compensation module is turned on, it may be equivalent to reserving sufficient time for the first adjustment voltage writing stage such that there may be enough time to adjust the bias state of the driving transistor. In addition, the interval between two adjacent second pulse signals may be set to be greater than or equal to 2H, and a reset stage may be performed between adjacent two second pulse signals, which may be beneficial to reserve sufficient reset time for the gate of the driving transistor, and thus may be beneficial to the recovery of the characteristics of the driving transistor.

Figure 7:
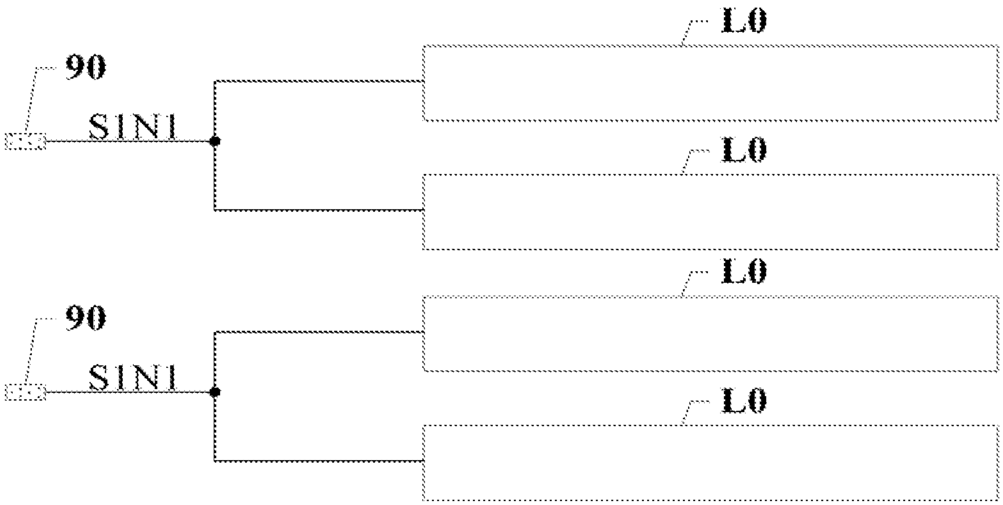
FIG. 7 illustrates an exemplary relationship between a control line connected to a first reset module and a pixel-row in a display panel according to various disclosed embodiments of the present disclosure.

FIG. 7 is a diagram showing an exemplary corresponding relationship between the control lines connected to the first reset module 10 and the pixel-rows in the display panel according to various embodiments of the present disclosure. The pixel-row L0 is only for illustration, in fact, each pixel-row L0 may correspond to a plurality of sub-pixels and pixel driving circuits. As shown in FIG. 7, in one embodiment, the control terminals of the first reset module 10 corresponding to the sub-pixels in number n of pixel-rows may be electrically connected to the same control line. In the reset stage T11, the same control line may transmit the first pulse signal to control the first reset module corresponding to the sub-pixels in the number n of pixel-rows to be turned on, the width of the first pulse signal may be greater than or equal to n×H, the width of the second pulse signal may be greater than or equal to n×H, and n may be an even number greater than two.

FIG. 7 illustrates the connection relationship between the control line and two pixel-rows L0, but it does not specify the number of pixel-rows corresponding to the same control line. In some other embodiments of the present disclosure, the same control line may also be electrically connected to the reset module of three or more than three pixel-rows. This embodiment is only illustrated by taking the same control line corresponding to two pixel-rows as an example. In one embodiment, the control line S1N1 connected to the first reset module may be electrically connected to the shift register 90 in the frame area of the display panel, and the pulse signal may be obtained through the shift register 90. When the same control line S1N1 is electrically connected to the first reset module in the pixel circuits in the two pixel-rows L0, the pixel driving circuits corresponding to the two pixel-rows L0 may share the same reset stage. That is to say, it may be possible to reset the gates of the driving transistors M0 in the pixel driving circuit corresponding to the two pixel-rows by using the same shift register, which may be beneficial to simplify the driving sequence of the display panel, reducing the number of shift registers connected to the control lines, and further facilitating the narrow bezel design of the display panel.

FIG. 4 and FIG. 5 illustrate the configuration that, in the same first node potential adjustment stage T1, the moment when the compensation module 20 is turned on does not overlap with the reset stage T11. At this time, referring to FIG. 1, after resetting the first node N1, the compensation module 20 may be turned on again, and the first adjustment voltage may be written into the first node N1 through the compensation module 20. In some other embodiments of the present disclosure, in the same first node potential adjustment stage T1, the stage in which the compensation module 20 is turned on may overlap with the reset stage T11, an example may be referred to FIG. 8.

Figure 8:
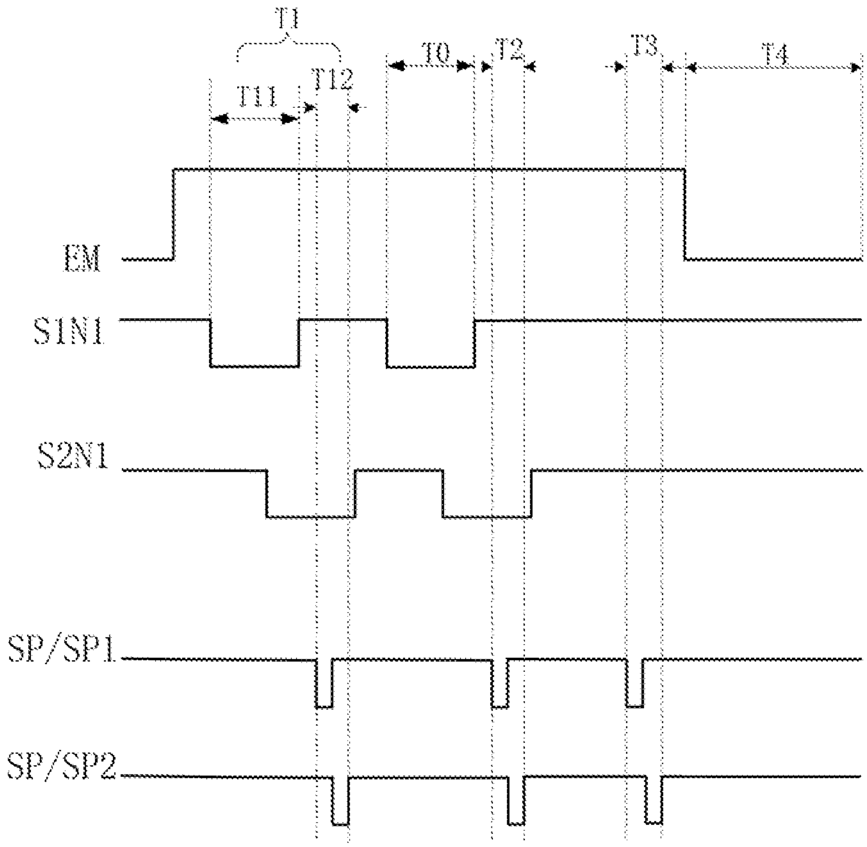
FIG. 8 illustrates another time sequence of an exemplary driving method of a display panel according to various disclosed embodiments of the present disclosure.

FIG. 8 is another time sequency of an exemplary driving method of a display panel according to various embodiments of the present disclosure. Referring to FIG. 1 and FIG. 8, in one embodiment, in a same time of first node potential adjustment stage T1, the time when the compensation module 20 is turned on may overlap with the reset stage T11, and the time when the compensation module 20 is turned off may be after the reset stage T11.

In one embodiment, the compensation module 20 may be connected between the first node N1 and the third node N3 of the pixel circuit, that is, between the gate and the second terminal of the driving transistor M0, and the control terminal of the compensation module 20 may be connected to the control line S2N1. When the moment when the compensation module 20 is turned on overlaps with the reset stage T11, the compensation module 20 and the first reset module 10 may be turned on at the same time during the overlapping time period. Because the compensation module 20 may be connected between the first node N1 and the third node N3, when the reset signal is provided to the first node N1 through the first reset module 10, the reset signal may be transmitted to the third node N3 through the compensation module 20 such that the reset of the gate and the second terminal of the driving transistor M0 may be realized through the reset signal, and it may be more conducive to the recovery of the characteristics of the driving transistor M0. The cut-off time of the compensation module 20 may be after the reset stage T11, that is, after the first reset module 10 is cut off, the compensation module 20 may be still in the on state for a period of time, and this period of time may correspond to the first adjustment voltage writing stage T12. At this stage, the bias state of the driving transistor M0 may be adjusted by writing the first adjustment voltage to the first node N1 through the compensation module 20. After resetting both the gate and the second terminal of the driving transistor M0, when adjusting the bias state of the driving transistor M0, it may be more conducive to the recovery of the characteristics of the driving transistor M0, and it may be more conducive to reducing the hysteresis effect of the driving transistor. Accordingly, it may have a more obvious effect to reduce the flickering phenomenon of the display panel during the screen switching process.

Further, referring to FIG. 1 and FIG. 8, in one embodiment, the first adjustment voltage writing stage T12 may adopt a one-drive-two design method, and the data writing stage T2 may adopt a one-drive-one design method, that is, an effective pulse of the control line S2N1 may control the conduction of the compensation modules 20 corresponding to two adjacent pixel-rows. Accordingly, the number of effective pulses on the control line S2N1 in the first voltage writing stage T12 may be reduced. The compensation modules in two adjacent pixel-rows 20 may correspond to the same gate driving circuit, that is, the same gate driving circuit may be used to provide signals to the control line S2N1 in the two pixel-rows, thus facilitating the simplification of the overall structure of the display panel. A effective pulse signal of the control line SP may control the conduction of the data writing module 30 corresponding to a pixel-row. The control lines SP1 and SP2 may respectively represent the control lines connected to the data writing modules in two adjacent pixel-rows.

In one embodiment, the reset stage T11 may also adopt a one-drive-two design, that is, a effective pulse signal of the control line S1N1 may control the conduction of the first reset module 10 corresponding to two adjacent pixel-rows, which may reduce the number of the effective pulses on the control line S1N1 in the reset stage T11 may be reduced. The first reset modules 10 in two adjacent pixel-rows may only need to correspond to the same gate driving circuit, that is, the same gate driving circuit may be used to provide signals to two lines S1N1 in each pixel-row, thus facilitating the simplification of the overall structure of the display panel. The number of gate driving circuits may be reduced in the pixel circuit such that the width of the bezel may not be affected.

Figure 9:
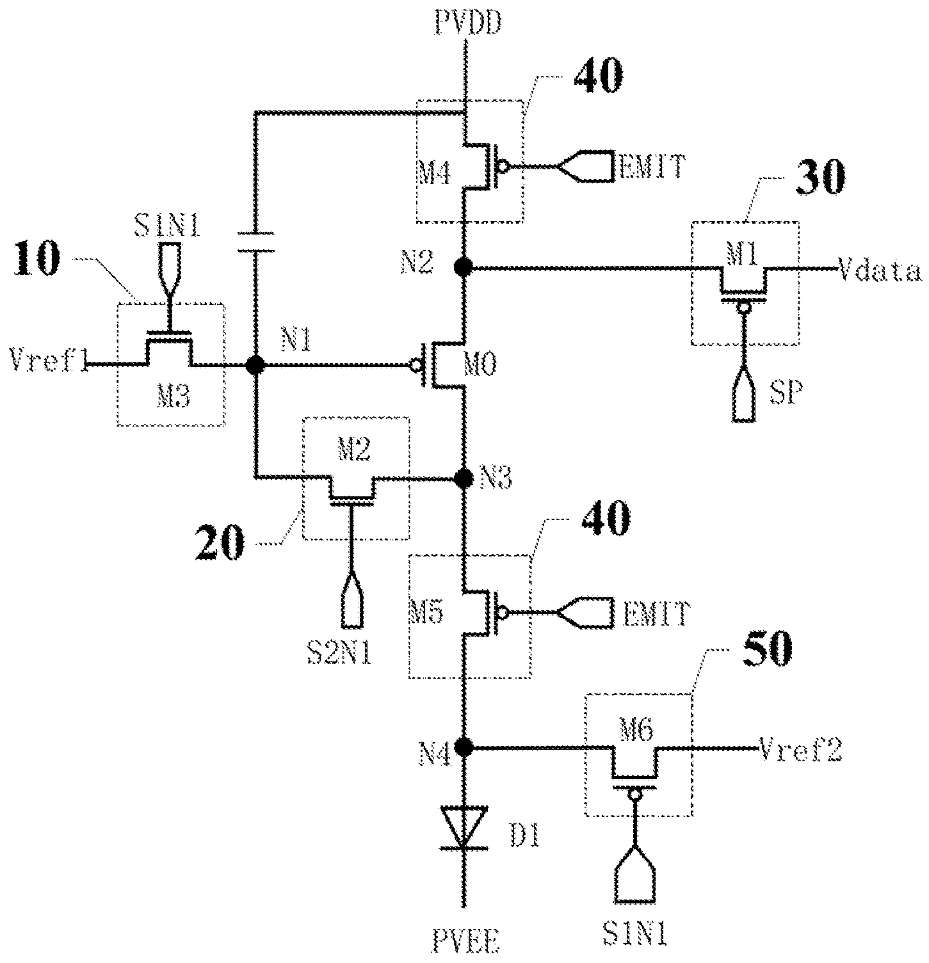
FIG. 9 illustrates another structure of an exemplary driving circuit of a display panel according to various disclosed embodiments of the present disclosure.
Figure 10:
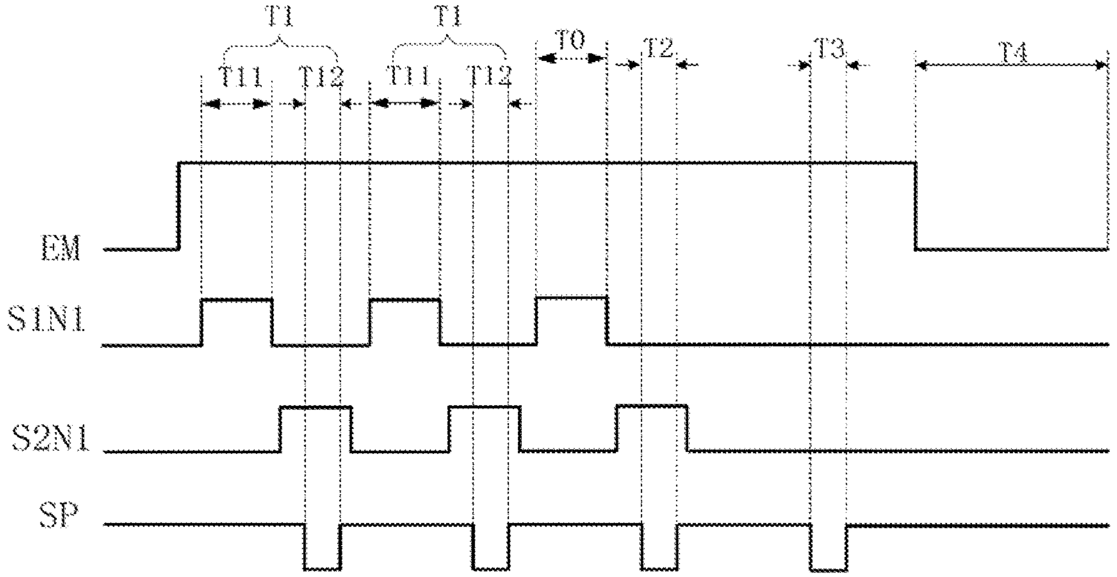
FIG. 10 illustrates an exemplary time sequence corresponding to the driving circuit in FIG. 9.

FIG. 9 is another structural schematic diagram of an exemplary driving circuit in the display panel according to various disclosed embodiments of the present disclosure. FIG. 10 is a time sequence corresponding to the driving circuit in FIG. 9. The difference between the driving circuits provided FIG. 9 and FIG. 1 may include that the types of transistors included in the first reset module 10 and the compensation module 20 may be different. In the embodiment shown in FIG. 1, the first reset module 10 and the compensation module 20 may be both P-type transistors, and the P-type transistor may be turned on by responding to the low-level signals. In the embodiment shown in FIG. 9, the first reset module 10 and the compensation module 20 may be both N-type transistors, which may be turned on in response to a high-level signal. Because the transistors in the first reset module 10 and the compensation module 20 may be directly connected to the first node N1, if the transistors in the compensation module 20 and the first reset module 10 are selected as N-type transistors, because the leakage current of the drain of the N-type transistors may be relatively small, which may be beneficial to reduce the impact of the leakage current of the transistor connected to the first node N1 on the gate potential of the driving transistor M0. Thus, the recovery of the characteristics of the driving transistor M0 before the data writing phase T2 may be facilitated.

Referring to FIG. 9 and FIG. 10, in one embodiment of the present disclosure, the pixel circuit may further include a storage capacitor C, a light-emission control module 40 and a second reset module 50. The data writing module 30 may include a first transistor M1. The compensation module 20 may include a second transistor M2. The first reset module 10 may include a third transistor M3. The light-emission control module 40 may include a fourth transistor M4 and a fifth transistor M5. The second reset module 50 may include a sixth transistor M6.

The first terminal of the driving transistor M0 may be connected to the second node N2, and the second terminal may be connected to the third node N3. The second node N2 may be connected to the first voltage signal line PVDD through the fourth transistor M4. The third node N3 may be connected to the fourth node N4 through the fifth transistor M5. The terminals of the light-emitting element D1 may be respectively connected to the fourth node N4 and the second voltage signal line PVEE. The storage capacitor C may be connected between the first voltage signal line PVDD and the first node N1. The second node N2 may be connected to the data signal terminal Vdata through the first transistor M1. In one embodiment, the data signal terminal Vdata may be connected to the data line, the terminals of the second transistor M2 may be respectively connected to the first node N1 and the third node N3, and the first node N1 may be connected to the reset signal line Vref1 through the third transistor M3. The terminals of the sixth transistor M6 may be respectively connected to the second reset signal line Vref2 and the fourth node N4.

In the reset stargate T11, the third transistor M3 may be turned on for a conduction, and the reset signal may be transmitted to the first node N1 through the first reset module 10 to reset the gate of the driving transistor M0.

In the first adjustment voltage writing stage T12, the first transistor M1 and the second transistor M2 may be turned on, and the first adjustment voltage may be written into the first node N1 through the data signal terminal to adjust the bias state of the driving transistor M0.

In the data writing stage T2, the first transistor M1 and the second transistor M2 may be turned on for a conduction, and the data voltage may be written into the pixel circuit through the data signal terminal.

In the first bias stage T3, the first transistor M1 may be turned on, the second transistor M2 may be turned off, and the second adjustment voltage may be written into the second node N2 through the data signal terminal to further adjust the bias state of the driving transistor M0.

In the light-emitting stage T4, the fourth transistor M4 and the fifth transistor M5 may be turned on, the first transistor M1, the second transistor M2, the third transistor M3 and the sixth transistor M6 may be turned off, and the light-emitting element D1 may respond to the driving current generated by the driving transistor M0 to emit light.

In the driving method of the display panel provided in this embodiment, before the data writing stage T2, a reset stage T11 and a first adjustment voltage writing stage T12 may be introduced. In the first adjustment voltage writing stage T12, the data signal terminal may write the first adjustment voltage into the first node N1 through the data writing module 30 and the compensation module 20. At this time, the first adjustment voltage written through the data signal terminal may be in a same column as the current sub-pixel. The data voltage of the sub-pixels in the previous pixel-row may also be the data voltage of the current sub-pixel. In such a configuration, there may be no need to introduce a new module structure for the first adjustment voltage writing stage T12 in the pixel driving circuit, and multiplexing the data writing module 30 may write the first adjustment voltage, while reducing the flicker phenomenon of the display panel, the structure of the pixel circuit may be simplified.

The embodiment of the present disclosure introduces the first bias stress stage T3 after the data writing stage T2 and before the light-emitting stage T4. In the first bias stress stages T3, the digital signal terminal may write the second adjustment voltage to the second node N2, and the bias state of the driving transistor M0 may be further adjusted before the light-emitting stage T4 to further avoid or reduce the drift of the threshold voltage of the driving transistor M0 before the light-emitting stage T4, and avoid or reduce the flicker phenomenon of the image switching process as much as possible. In the first bias stress stage T3, there may be also no need to introduce a new module structure for the first bias stress stage T3 in the pixel drive circuit, and multiplexing the data writing module 30 may write the second adjustment voltage. Thus, while reducing the flicker phenomenon of the display panel, it may also be beneficial to simplify the structure of the pixel circuit.

Figure 11:
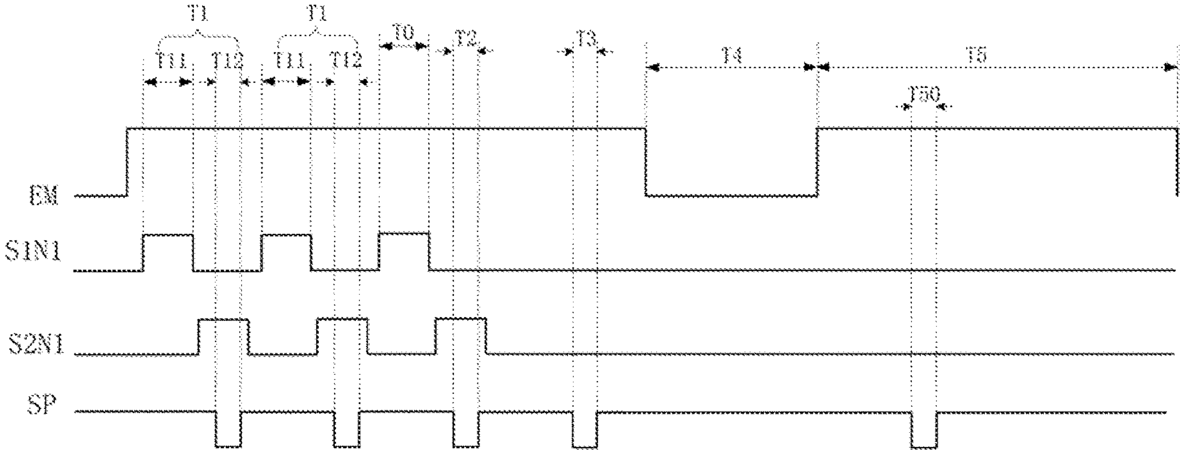
FIG. 11 illustrates another exemplary time sequence corresponding to the driving circuit in FIG. 9.

FIG. 11 is another exemplary time sequence corresponding to the driving circuit in FIG. 9, and this embodiment shows a scheme of introducing a holding stage T5 after the light-emitting stage T4.

Referring FIG. 9 and FIG. 11, in one embodiment of the present disclosure, the time for displaying one frame may also include a holding stage T5 after the light-emitting stage T4, and the holding stage T5 may include a second bias stress stage T50. In the second bias stage T50, the first transistor M1 may be turned on, the second transistor M2 may be turned off, and the third adjustment voltage may be written into the second node N2 through the data signal terminal.

Specifically, in the holding stage T5 after the light-emitting stage T4, the embodiment of the present disclosure may introduce a second bias stress stage T50 to write the third adjustment voltage to the second node N2 to adjust the bias stage of the driving transistor M0 after the light-emitting stage T4, and to facilitate recovery of the characteristics of the driving transistor M0 after the light-emitting stage T4. Before the next light-emitting stage T4 comes, at least one reset stage T11 and one first adjustment voltage writing stage T12 may be performed before the data writing stage T2, and the first bias stress stage T3 may be performed after the data writing stage T2. Combined with the aforementioned second bias stress stage T50, the bias state of the driving transistor M0 may be adjusted between the two light-emitting stages T4 to promote the recovery of the characteristics of the driving transistor M0, which may be more conducive to reducing the hysteresis effect of the driving transistor M0 such that the driving transistor M0 may not be affected by the picture data of the previous frame, and the driving current corresponding to the preset switching picture may still be generated, which may be conducive to quickly switching the picture to the preset switching picture. Thus, the flickering phenomenon during the picture switching process may be reduced, and the display effect may be improved.

When the second bias stress stage T50 is introduced, the data signal terminal Vdata may write the third adjustment voltage into the second node N2 through the data writing module 30, and there may be also no need to introduce a new module for the second bias stress stage T50 in the pixel driving circuit. The third adjustment voltage may be written by multiplexing the data writing module 30. Thus, while reducing the flicker phenomenon of the display panel, it may be also beneficial to simplify the structure of the pixel circuit.

Figure 12:
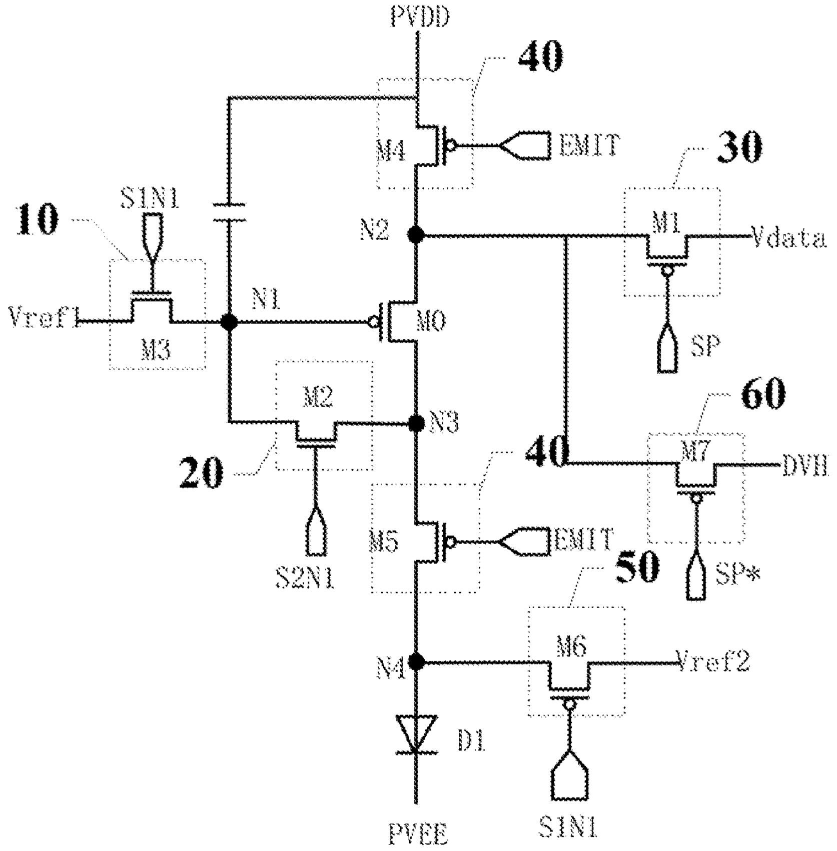
FIG. 12 illustrates another structure of an exemplary driving circuit of a display panel according to various disclosed embodiments of the present disclosure.
Figure 13:
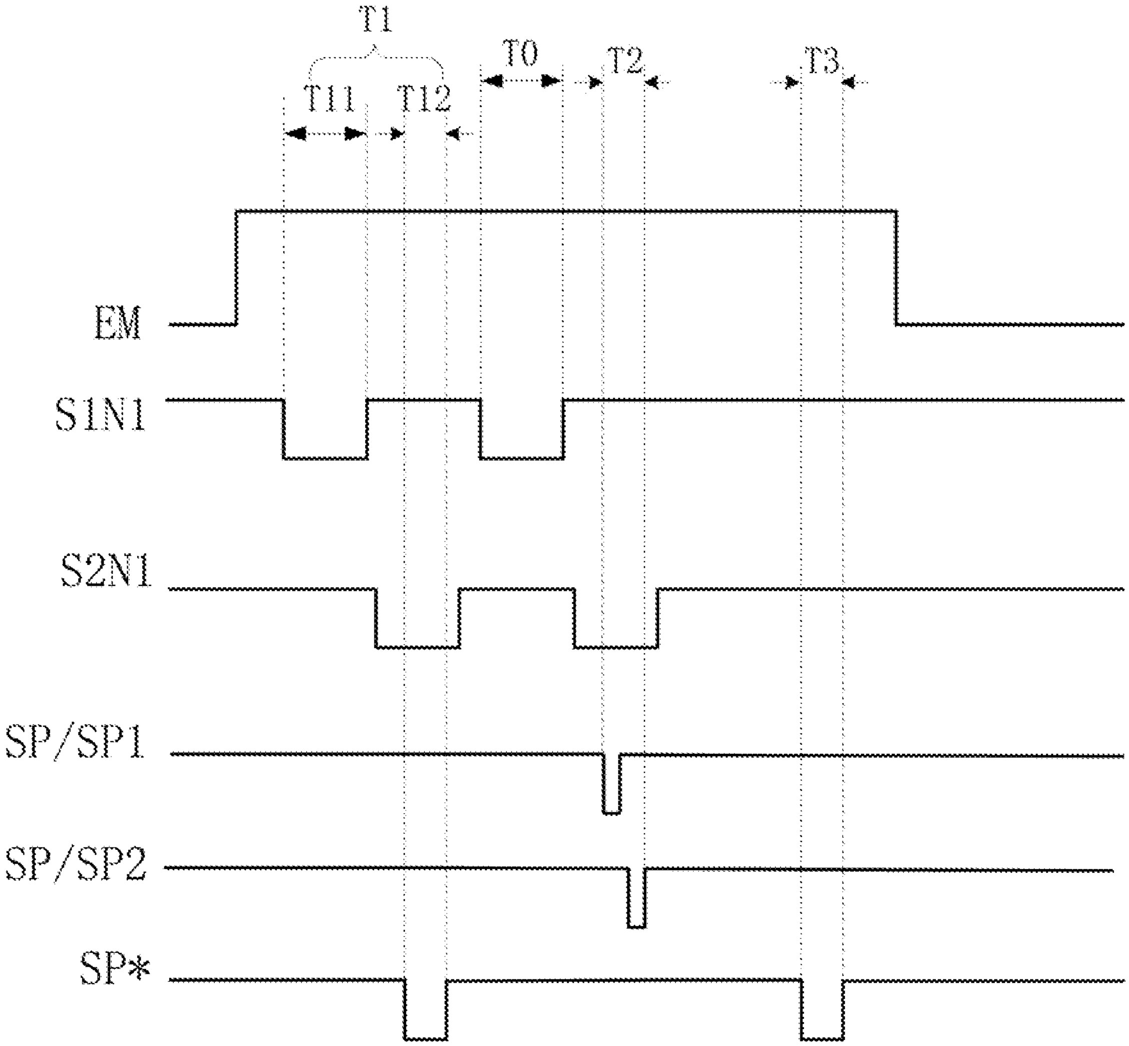
FIG. 13 illustrates an exemplary time sequence corresponding to the driving circuit in FIG. 12.

FIG. 12 is another exemplary structural schematic diagram of a driving circuit in the display panel according to various disclosed embodiments of the present disclosure. FIG. 13 is an exemplary time sequence corresponding to the driving circuit in FIG. 12. FIGS. 2-12 illustrates an exemplary solution for introducing a voltage adjustment module into the pixel circuit.

Referring to FIG. 12 and FIG. 13, in one embodiment of the present disclosure, the pixel circuit may further include a storage capacitor C, a light-emission control module 40, a second reset module 50 and a voltage adjustment module 60. The data writing module 30 may include a first transistor M1. The compensation module 20 may include a second transistor M2. The first reset module 10 may include a third transistor M3. The light-emission control module 40 may include a fourth transistor M4 and a fifth transistor M5. The second reset module 50 may include a sixth transistor M6, and the voltage adjustment module 60 may include a seventh transistor M7. The first terminal of the driving transistor M0 may be connected to the second node N2, and the second terminal may be connected to the third node N3. The second node N2 may connected to the first voltage signal line through the fourth transistor M4, and the third node N3 may be connected to the first voltage signal line through the fifth transistor M5. The terminals of the light-emitting element D1 may be respectively connected to the fourth node N4 and the second voltage signal line PVEE. The storage capacitor C may be connected between the first voltage signal line PVDD and the first node N1. The second node N2 may be connected to the data signal terminal Vdata through the first transistor M1. In one embodiment, the data signal terminal Vdata may be used to connect to the data line; the two terminals of the second transistor M2 may be respectively connected to the first node N1 and the third node N3, and the first node N1 may be connected to the first reset signal line Vref1 through the third transistor M3. The two terminals of the sixth transistor M6 may be respectively connected to the second reset signal line Vref2 and the fourth node N4, and the two terminals of the seventh transistor M7 may be respectively connected to the second node N2 and the voltage adjustment terminal DVH.

In the reset stage T11, the third transistor M3 may be turned on, and the reset signal may be transmitted to the first node N1 through the first reset module 10 to reset the gate of the driving transistor M0.

In the first adjustment voltage writing stage T12, the seventh transistor M7 and the second transistor M2 may be turned on, and the first adjustment voltage may be written into the first node N1 through the voltage adjustment terminal to adjust the bias state of the driving transistor M0.

In the data writing stage T2, the first transistor M1 and the second transistor M2 may be turned on, the seventh transistor M7 may be turned off, and the data voltage may be written into the pixel circuit through the data signal terminal Vdata.

In the first bias stage T3, the seventh transistor M7 may be turned on, the first transistor M1 and the second transistor M2 may be turned off, and the second regulated voltage may be written into the second node N2 through the voltage adjustment terminal, and the bias state of the driving transistor M0 may be further adjusted.

In the light-emitting stage T4, the fourth transistor M4 and the fifth transistor M5 may be turned on, the first transistor M1, the second transistor M2, the third transistor M3 and the sixth transistor M6 may be turned off, and the light-emitting element D1 may respond to the driving current generated by the driving transistor M0 to emit light.

In the driving method of the display panel provided in this embodiment, before the data writing stage T2, the reset stage T11 and the first adjustment voltage writing stage T12 may be introduced and a voltage adjustment module 60 may be introduced in the pixel circuit. In the first adjustment voltage writing stage T12, the voltage adjustment terminal may write the first adjustment voltage into the first node N1 through the voltage adjustment module 60 and the compensation module 20. At this time, the first adjustment voltage written through the voltage adjustment terminal DVH may be the black state voltage of the display panel. In some other embodiments of the present disclosure, the first adjustment voltage written into the first node N1 through the voltage adjustment terminal may also be other voltages that are close to the voltage value of the black state voltage and relatively high. When a voltage with a higher value is written into the first node N1 as the first adjustment voltage, the current flowing through the driving transistor M0 may be larger, which may be more conducive to reducing the threshold voltage drift problem of the driving transistor M0 and may be more beneficial to reducing the hysteresis effect of the driving transistor M0. Therefore, when the voltage adjustment module 60 is introduced into the pixel circuit, the first adjustment voltage with a larger value may be written into the first node N1 according to the actual situation to effectively reduce the hysteresis effect of the driving transistor M0, thereby effectively reducing the picture switching flickering issues during the process.

The embodiment of the present disclosure may introduce a first bias stress stage T3 after the data writing stage T2 and before the light-emitting phase T4. In the first bias stress stage T3, the voltage adjustment module 60 may write the second adjustment voltage to the second node N2, and the bias state of the driving transistor M0 may be further adjusted before the light-emitting stage T4. At this time, the first adjustment voltage with a larger value may also be written into the second node N2 according to the actual situation, which is more conducive to promoting the recovery of the characteristics of the driving transistor M0, and further helps to reduce the flicker problem that occurs during the screen switching process.

In the embodiment of the present disclosure, a voltage adjustment module 60 may be introduced into the pixel circuit. In the first adjustment voltage writing stage T12 and the first bias stress stage T3, the first adjustment voltage and the second adjustment voltage may be written into the first node N1 and the second node N2 respectively through the voltage adjustment module 60. Thus, the application flexibility of the pixel circuit may be improved.

It should be noted that the embodiment of the present disclosure shows a scheme of connecting the voltage adjustment module 60 to the second node N2. In some other embodiments of the present disclosure, the voltage adjustment module 60 may also be connected to the third node N3, the bias state of the driving transistor M0 may be adjusted through the third node N3, the flicker problem of the display panel may also be reduced.

In one embodiment, the first adjustment voltage writing stage T12 may adopt a one-drive-two design method, and the data writing stage T2 may adopt a one-drive-one design method. For example, an effective pulse signal of the control line S2N1 may control the conduction of the compensation modules 20 corresponding to two adjacent pixel-rows. Thus, the number of effective pulses on the control line S2N1 in the first voltage writing stage T12 may be reduced. The compensation modules 20 in two adjacent pixel-rows may only need to correspond to one gate driving circuit, that is, the same gate driving circuit may be used to provide signals to the control lines S2N1 in two pixel-rows, which may be beneficial to simplify the overall structure of the display panel. An effective pulse signal of the control line SP may control the conduction of the data writing module 30 corresponding to a pixel-row. The control lines SP1 and SP2 respectively represent the control lines connected to the data writing modules in two adjacent pixel-rows.

In one embodiment, the first bias stress stage T3 may adopt a one-drive-two design method. In the first bias stress stage T3, providing an effective pulse signal to the control line SP* may control the voltage adjustment modules 60 in two adjacent pixel-rows to be turned on, and the voltage adjustment module 60 may write the second adjustment voltage to the second nodes N2 in two adjacent pixel-rows. In such a way, the voltage adjustment modules 60 in two adjacent pixel-rows may only need to correspond to the same gate driving circuit, that is, using one gate driving circuit may perform the signal providing to control lines SP* corresponding to the voltage adjustment modules 60 in two pixel-rows, which may be beneficial to simplify the overall structure of the display panel.

Figure 14:
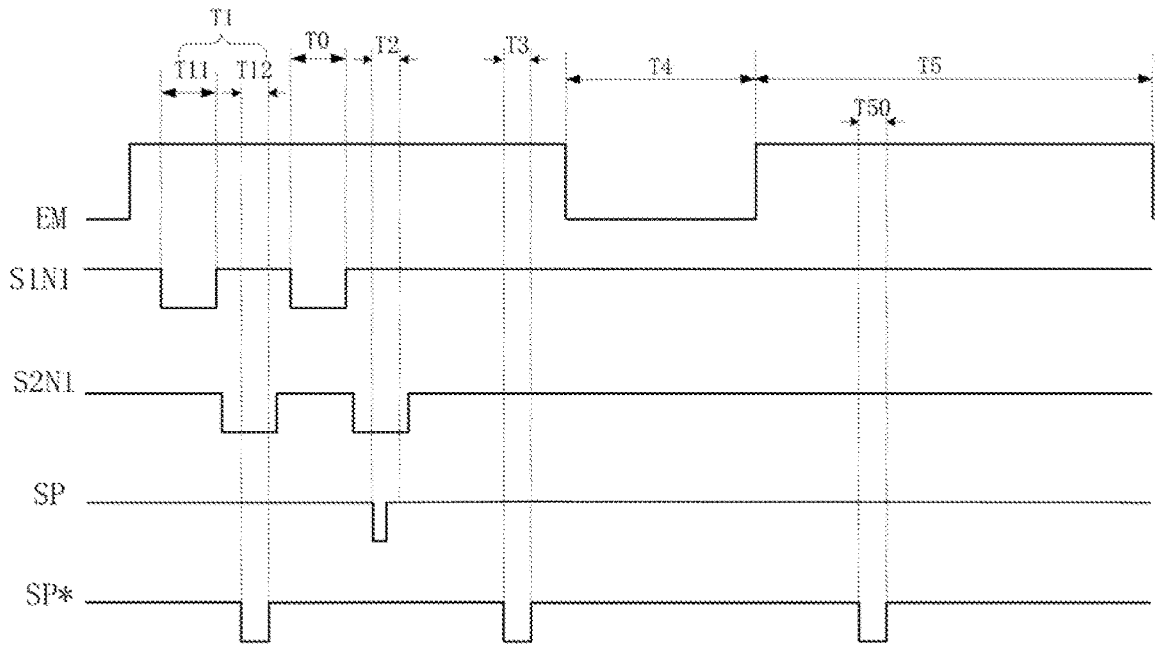
FIG. 14 illustrates another exemplary time sequence corresponding to the driving circuit in FIG. 12.

FIG. 14 is another exemplary time sequence corresponding to the driving circuit in FIG. 12. This embodiment illustrates a scheme of introducing a holding stage T5 after the light-emitting phase T4.

Referring to FIG. 12 and FIG. 14, in one embodiment of the present disclosure, a time for displaying one frame may also include a holding stage T5 after the light-emitting stage T4. The hold stage T5 may include a second bias stress stage T50. In the second bias stage T50, the seventh transistor M7 may be turned on, and the third adjustment voltage may be written into the second node N2 through the voltage adjustment terminal DVH.

Specifically, in the holding stage T5 after the light-emitting stage T4, the embodiment of the present disclosure may introduce a second bias stress stage T50 to write the third adjustment voltage to the second node N2 to adjust the bias state of the driving transistor M0 after the light-emitting stage T4 to facilitate recovery of the characteristics of the driving transistor M0 after the light-emitting stage T4. In the second bias stage T50, according to the actual situation, the voltage adjustment module 60 may be used to write a third adjustment voltage with a higher voltage value to the second node N2 to adjust the bias state of the driving transistor M0, which may be more conducive to promoting the recovery of the characteristics of the driving transistor M0 after the current light-emitting stage T4 and before the next light-emitting stage T4. Before the next light-emitting phase T4 comes, at least one reset stage T11 and one first adjustment voltage writing stage T12 may be performed before the data writing stage T2, and the first bias stress stage T3 may be performed after the data writing stage T2. Combined with the aforementioned the second bias stress stage T50, the bias state of the driving transistor M0 may be adjusted between the two light-emitting stages T4 to promote the recovery of the characteristics of the driving transistor M0, which may be more conducive to reducing the hysteresis effect of the driving transistor M0 such that the driving transistor M0 may not be affected by the picture data of the previous frame, and the driving current corresponding to the preset switching picture may still be generated, which may be conducive to quickly switching the picture to the preset switching picture, thus helping to reduce the flickering phenomenon during the picture switching process and improve the display effect.

It should be noted that the embodiments in FIG. 12 to FIG. 14 only show the scheme of introducing the voltage adjustment module 60 into the pixel circuit when the transistors in the first reset module 10 and the compensation module 20 are N-type transistors, when the transistors in the first reset module 10 and the compensation module 20 are P-type transistors, the voltage adjustment module 60 may also be introduced into the pixel circuit, the only difference is that the effective pulse signal that controls the conduction of the transistors in the first reset module 10 and the compensation module 20 may be different.

Figure 15:
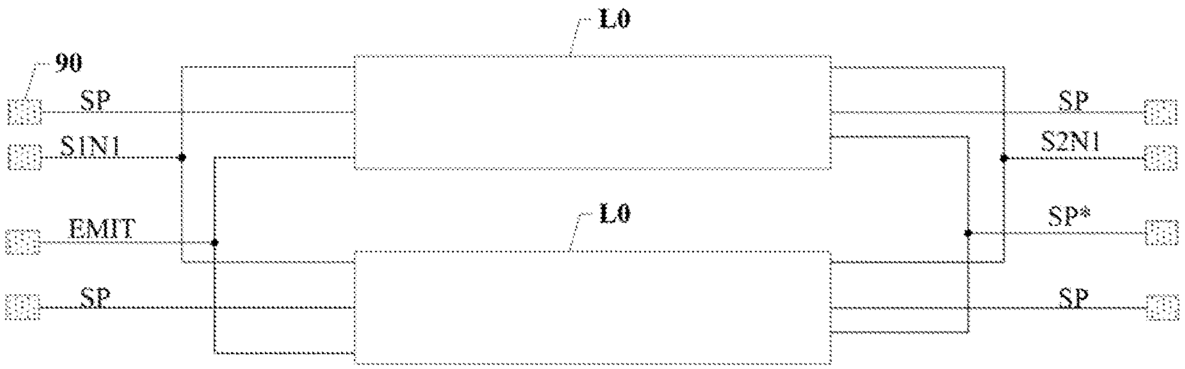
FIG. 15 illustrates an exemplary connection between the first type of connection lines and the pixel-rows in a display panel.

FIG. 15 is a schematic diagram of an exemplary connection between the first type of control lines and the pixel-rows in the display panel. This embodiment only shows a corresponding relationship between the first type of control lines and the pixel-rows, and does not show the pixel-rows. FIG. 15 only illustrates the configuration that the first control line S1N1, the second control line S2N1, the third control line SP* and the light-emission control line EMIT are respectively electrically connected to the pixel driving circuits corresponding to the light-emitting elements D1 in the two pixel-rows, for example, one above-mentioned control line may drive two pixel-rows. In some other embodiments of the present disclosure, one above-mentioned control line may also drive three or more pixel-rows, the present disclosure does not specifically limit the number of pixel-rows driven by the control line. In one embodiment, the first type of control lines may be electrically connected to a shift register, and the pulse signal may be obtained through the shift register.

Referring to FIG. 12 and FIG. 15, in one embodiment of the present disclosure, the display panel may include a first type of control lines, and the first type of control lines may include at least one of a first control line S1N1 connected to the control terminal of the third transistor M3 and the control terminal of the sixth transistor M6, a second control line S2N1 connected to the control terminal of the second transistor M2, a third control line SP* connected to the control terminal of the seventh transistor M7, a light-emission control line EMIT connected to the control terminal of the fourth transistor M4 and the control terminal of the fifth transistor M5. A same first-type of control lines may be electrically connected to the pixel circuits corresponding to the S pixel-rows in the display panel, and S≥2.

Specifically, the shift register may be connected to the first reset module 10 in the pixel driving circuits of the two pixel-rows through the same first control line S1N1, and the reset of the first node N1 in the pixel driving circuits in the two pixel-rows may be realized through the control of the first control line S1N1. The shift register 90 may be connected to the compensation module 20 of the pixel driving circuit in the two pixel-rows through the second control line S2N1, and the threshold compensation of two pixel driving circuits may be realized by the second control line S2N1. The shift register 90 may be connected to the voltage adjustment module 60 in the pixel driving circuits of the two pixel-rows through the third control line SP*, and the bias state of the driving transistor M0 of the pixel driving circuits in the two pixel-rows may be realized through the control of the third control line SP*. In such a configuration, the number of first-type control lines and shift registers included in the display panel may be significantly reduced, which may be conducive to reducing the space occupied by the shift registers in the frame area of the display panel, and may be thus conducive to realizing a narrow bezel design of the display panel.

It should be noted that the embodiment shown in FIG. 12 only shows the scheme that the signal line connected to the control terminal of the second reset module 50 is the first control line S1N1. The signal line connected to the control terminal of the second reset module 50 may also be any one of the second control line S2N1 and the third control line SP*, or may also be connected to the control line SP connected to the data writing module, which is not specifically limited. In one embodiment, the first reset signal line Vref1 and the second reset signal line Vref2 may multiplex the same signal line, which is not specifically limited in the present disclosure.

In one embodiment of the present disclosure, among the effective pulse signals provided by the first type of control lines, the pulse width of a single effective pulse signal may be greater than or equal to 2H, and H may be the time it takes to scan one row of pixels.

Specifically, when the first-type control line adopts the design of one-drive-two, that is, one first-type control line may drives the pixel circuits corresponding to two pixel-rows, the width of the single effective pulse provided by the first-type control line may be set to be greater than the time required for scanning the two pixel-rows of the display panel such that the effective pulse signal on the first type of control line may be transmitted to each pixel circuit in the corresponding two pixel-rows, ensuring the availability of the function of the module to which the line is connected. In some embodiments, the pulse width of a single effective pulse signal provided by the first type of control line may be 6H, 10H, or 14H, etc., and may be provided to the control terminals of the first reset module 10, the compensation module 20 and the voltage regulation module 60. Extending the time of the valid signal may be more conducive to realizing the recovery of the characteristics of the driving transistor M0, and more conducive to reducing the hysteresis characteristics of the driving transistor M0.

Further, referring to FIG. 12, in one embodiment of the present disclosure, both the second transistor M2 and the third transistor M3 may be low temperature polycrystalline oxide transistors. In the pixel circuit provided by the embodiment of the present disclosure, both the second transistor M2 in the first reset module 10 and the third transistor M3 in the compensation module 20 may be directly connected to the first node N1, when the second transistor M2 and the third transistor M3 are selected as a low-temperature polycrystalline oxide transistors, because the leakage current of the low-temperature polycrystalline oxide transistors may be relatively small, it may be beneficial to reduce the impact of the leakage current of the transistor connected to the first node N1 on the gate of the driving transistor M0. Therefore, it may be beneficial to recover the characteristics of the driving transistor M0 before the data writing stage T2.

Figure 16:
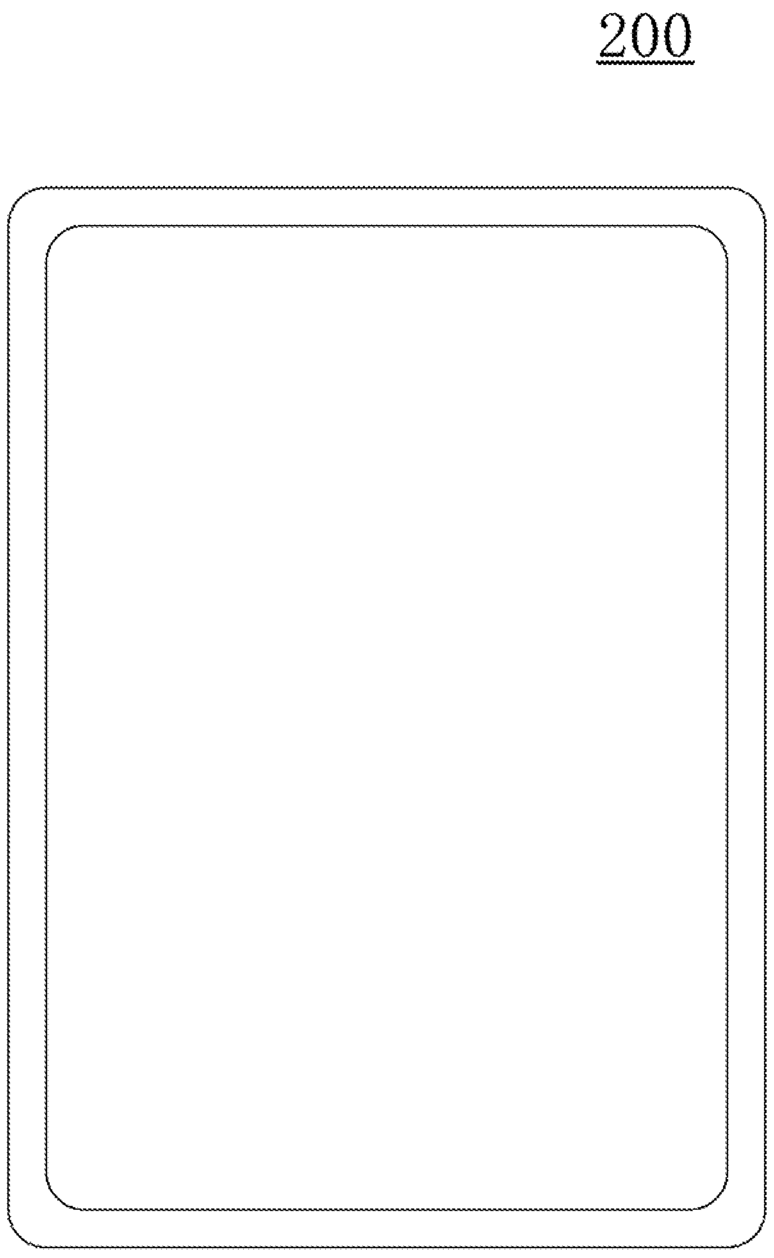
FIG. 16 illustrates an exemplary display device according to various disclosed embodiments of the present disclosure.

The present disclosure also provides a display panel. FIG. 16 is a schematic structural view of an exemplary display panel according to various disclosed embodiments of the present disclosure. The display panel may be driven by the driving method provided by any of the above-mentioned embodiments, or other appropriate driving method. In the driving method provided by the foregoing embodiments, the first node potential adjustment stage may be introduced before the data writing stage, and the first bias stress stage may be introduced after the data writing stage and before the light-emitting stage to realize the control of the driving transistor before the light-emitting stage. The adjustment of the bias state may reduce the threshold voltage drift phenomenon of the driving transistor such that the display screen generated in the light-emitting stage may be more consistent with the preset switching screen, which may be more conducive to reducing the flicker phenomenon that occurs during the screen switching process and may be more conducive to improving the display effect.

The display panel may be a display panel using the organic light-emitting diode display technology, that is, an organic light-emitting diode (OLED) display panel. In one embodiment, the basic structure of the light-emitting layer of the OLED display panel may usually include an anode, a light-emitting material layer and a cathode. When the power supplies a proper voltage, the holes in the anode and the electrons in the cathode will combine in the luminescent material layer to produce bright light. Compared with thin film field-effect transistor liquid crystal display device, the OLED display devices may have the characteristics of high visibility and high brightness, and are more power-saving, lighter in weight, and thinner in thickness. Certainly, in some other embodiments of the present disclosure, the display panel may also be a display panel using a light-emitting diode display technology, such as a Micro LED display panel, or a Mini LED display panel, etc.

It can be understood that the display panel provided by the embodiments of the present disclosure may be applied to other display devices with display functions, such as computers, mobile phones, and tablets, and the present disclosure does not specifically limit this. The display panel provided by the embodiments of the present disclosure may have beneficial effects of the driving method of the display panel provided by the embodiments of the present disclosure. For details, reference may be made to the specific descriptions of the display panel in the above embodiments, and details will not be repeated herein.

As disclosed, the driving method of the display panel and the display panel provided by the present disclosure may at least achieve the following beneficial effects.

In the driving method of the display panel and the display panel provided by the present disclosure, the time for display one frame may include N times of first node potential adjustment stages, one data writing stage, and at least one first bias stress stage performed before the light-emitting stage. The first node potential adjustment stages performed before the data writing stage may include N reset stages and N first adjustment voltage writing stages, that is, the N reset stages and N times of first adjustment voltage writing stages may have been performed before the data writing stage. In the reset stage, the reset signal may be written to the first node in the drive circuit to reset the gate of the driving transistor. In the first adjustment voltage writing stage, the compensation module in the driving circuit may be turned on, and the first adjustment voltage may be written to the first node, which may be used to adjust the bias state of the driving transistor, and the threshold compensation and characteristic recovery of the driving transistor may be realized. N times of reset stages and first adjustment voltage writing stages may be performed before the data writing stage, that is, before the data writing stage, there may be N times of current passing through the driving transistor to reduce the hysteresis effect of the driving transistor, and the characteristics of the driving transistor may be restored to the original characteristics as much as possible. Thus, the driving transistor may not be affected by the previous frame of picture data and may still generate the driving current corresponding to the preset switching picture, which may be conducive to the rapid switching of the picture to the preset switching picture. Thus, it may be beneficial to reduce flickering phenomenon that occurs during the screen switching process and improve the display effect. In addition, the present disclosure also introduces a first bias stress stage after the data writing stage and before the light-emitting stage, and writes the second adjustment voltage to the source or the drain of the driving transistor in the first bias stress stage to further control the voltage of the driving transistor. Thus, the bias state of the driving transistor may be further adjusted to reduce or avoid the threshold voltage drift phenomenon of the driving transistor after the data writing stage. Thus, the display screen generated during the light-emitting stage may be more consistent with the preset switching screen, which may be more conducive to reducing the flicker phenomenon that occurs during the screen switching process, and may be more conducive to improving the display effect.

Although some specific embodiments of the present disclosure have been described in detail through examples, those skilled in the art should understand that the above examples are for illustration only and not intended to limit the scope of the present disclosure. Those skilled in the art will appreciate that modifications can be made to the above embodiments without departing from the scope and spirit of the disclosure. The scope of the disclosure is defined by the appended claims.

What is claimed is:

1. A driving method of a display panel, comprising:

providing the display panel, wherein the display panel includes a light-emitting element and a pixel circuit connected to the light-emitting element, the pixel circuit includes a first reset module, a data writing module, a compensation module and a driving transistor, a control terminal of the driving transistor is connected to a first node, time for the display panel to display one frame includes N times of first node potential adjustment stages, one data writing stage and at least one bias stress performed before a light-emitting stage, the data writing stage is after the N times of first node potential adjustment stages and before the first bias stress stage, the N times of first node potential adjustment stages include N reset stages and N first adjustment voltage writing stages, an i-th first adjustment voltage writing stage is after an i-th reset stage, 1≤i≤N, i is an integer, and N is an integer greater than or equal to two;

in the reset stage, turning on the first reset module, and writing a reset signal to the first node using the first reset module;

in the first adjustment voltage writing stage, turning off the first reset module, turning on the compensation module, and writing a first adjustment voltage into the first node to adjust a bias state of the driving transistor;

in the data writing stage, turning on the data writing module and the compensation module, and writing data signals using the data writing module;

in the first bias stress stage, turning off the compensation module, and writing a second adjustment voltage into a source or a drain of the driving transistor to adjust a bias state of the driving transistor; and in the light-emitting stage, generating a driving current to drive the light-emitting element to emit light using the driving transistor.

2. The driving method according to claim 1, wherein:

the display panel includes a plurality of pixel-rows;

one pixel-row of the plurality of pixel-rows includes a plurality of sub-pixels;

when the first node potential adjustment stage is performed on a sub-pixel in an m-th row and an n-th column, the first adjustment voltage written to the first node is a data voltage of sub-pixels in an n-th pixel column of a number (m-k) of pixel-rows;

m≥2, n≥1, 1≤k<m; and m, n and k are all integers.

3. The driving method according to claim 1, wherein:

the display panel includes a plurality of pixel-rows;

one pixel-row of the plurality of pixel-rows includes a plurality of sub-pixels;

when the first node potential adjustment stage is performed on a sub-pixel in an m-th row and an n-th column, the first adjustment voltage written to the first node is a data voltage of a sub-pixel in an n-th column and an m-th row; or the first adjustment voltage written to the first node is a black state voltage of the display panel; and m≥1 and n≥1.

4. The driving method according to claim 1, wherein:

the display panel includes a normal display mode, a high brightness mode, and an always on display mode;

within the time for the display panel to display the one frame, a number of the first node potential adjustment stages performed by the display panel in the always on display mode is greater than a number of the first node potential adjustment stages performed in the normal display mode and the high brightness mode.

5. The driving method according to claim 1, wherein:

in a same first node potential adjustment stage, a width of a single effective pulse signal that controls to turn on the first reset module is greater than or equal to 2H, a width of a single effective pulse signal that controls to turn on the compensation module is greater than or equal to 2H, and H is time required to scan a row of sub-pixels in the display panel.

6. The driving method according to claim 1, wherein:

in a same first node potential adjustment stage, an effective pulse signal for controlling to turn on the first reset module is a first pulse signal, an effective pulse signal for controlling to turn on the compensation module is a second pulse signal, and an interval between two adjacent first pulse signals is at least 2H, and an interval between two adjacent second pulse signals is at least 2H, and H is time required for scanning a row of sub-pixels in the display panel.

7. The driving method according to claim 6, wherein:

control terminals of the first reset module corresponding to sub-pixels in a number n of pixel-rows are electrically connected to a same control line;

in the reset stage, the same control line transmits the first pulse signal to control to turn on the first reset module corresponding to the sub-pixels in the number n of pixel-rows;

a width of the first pulse signal is greater than or equal to n×H;

a width of the second pulse signal is greater than or equal to n×H; and n is an even number greater than or equal to two.

8. The driving method according to claim 1, wherein:

in a same first node potential adjustment stage, a moment when the compensation module is turned on overlaps with the reset stage, and a moment when the compensation module is turned off is after the reset stage.

9. The driving method according to claim 1, wherein:

the pixel circuit further includes a storage capacitor, a light-emission control module and a second reset module, the data writing module includes a first transistor, the compensation module includes a second transistor, the first reset module includes a third transistor, the light-emitting control module includes a fourth transistor and a fifth transistor, and the second reset module includes a sixth transistor;

a first terminal of the driving transistor is connected to the second node, and a second terminal of the driving transistor is connected to the third node;

the second node is connected to a first voltage signal line through the fourth transistor, and the third node is connected to the fourth node through the fifth transistor;

two terminals of the light-emitting element are respectively connected to the fourth node and a second voltage signal line;

the storage capacitor is connected between the first voltage signal line and the first node;

the second node is connected to the data signal terminal through the first transistor;

two terminals of the second transistor are respectively connected to the first node and the third node, and the first node is connected to a first reset signal line through the third transistor;

two terminals of the sixth transistor are respectively connected to the second reset signal line and the fourth node;

in the reset state, the third transistor is turned on;

in the first adjustment voltage writing stage, the first transistor and the second transistor are turned on, and the first adjustment voltage is written into the first node through the data signal terminal;

in the data writing stage, the first transistor and the second transistor are turned on;

in the first bias stress stage, the first transistor is turned on, the second transistor is turned off, and the second adjustment voltage is written into the second node through the data signal terminal; and in the light-emitting stage, the fourth transistor and the fifth transistor are turned on, and the first transistor, the second transistor, the third transistor and the sixth transistor are turned off.

10. The driving method according to claim 9, wherein:

the time for the display panel to display the one frame also includes a holding stage after the light-emitting stage;

the holding stage includes a second bias stress stage; and in the second bias stress stage, the first transistor is turned on and the second transistor is turned off, and a third adjustment voltage is written to the second node through the data signal terminal.

11. The driving method according to claim 1, wherein:

the pixel circuit further includes a storage capacitor, a light-emitting control module, a second reset module, and a voltage adjustment module, the data writing module includes a first transistor, the compensation module includes a second transistor, and the first reset module includes a third transistor, the light-emitting control module includes a fourth transistor and a fifth transistor, the second reset module includes a sixth transistor, and the voltage adjustment module includes a seventh transistor;

a first terminal of the driving transistor is connected to the second node, and a second terminal of the driving transistor is connected to the third node;

the second node is connected to a first voltage signal line through the fourth transistor, and the third node is connected to the fourth node through the fifth transistor;

two terminals of the light-emitting element are respectively connected to the fourth node and a second voltage signal line;

the storage capacitor is connected between the first voltage signal line and the first node;

the second node is connected to the data signal terminal through the first transistor;

two terminals of the second transistor are respectively connected to the first node and the third node, and the first node is connected to a first reset signal line through the third transistor;

two terminals of the sixth transistor are respectively connected to the second reset signal line and the fourth node;

two terminals of the seventh transistor are respectively connected to the second node and the voltage adjustment terminal;

in the reset state, the third transistor is turned on;

in the first adjustment voltage writing stage, the seventh transistor and the second transistor are turned on, and the first adjustment voltage is written into the first node through the voltage adjustment terminal;

in the data writing stage, the first transistor and the second transistor are turned on;

in the first bias stress stage, the seventh transistor is turned on, the first transistor and the second transistor are turned off, and the second adjustment voltage is written into the second node through the voltage adjustment terminal; and in the light-emitting stage, the fourth transistor and the fifth transistor are turned on, and the first transistor, the second transistor, the third transistor and the sixth transistor are turned off.

12. The driving method according to claim 11, wherein:

the time for the display panel to display the one frame also includes a holding stage after the light-emitting stage;

the holding stage includes a second bias stress stage; and in the second bias stress stage, the seventh transistor is turned on and a third adjustment voltage is written into the second node through the voltage adjustment terminal.

13. The driving method according to claim 11, wherein:

the display panel includes a first type of control lines;

the first type of control lines include at least one of a first control line connected to control terminals of the third transistor and the sixth transistor, a second control line connected to a control terminal of the second transistor, a third control line connected to a control terminal of the seventh transistor, and a light-emitting control line connected to control terminals of the fourth transistor and the fifth transistor;

a same first-type of control line is electrically connected to pixel circuits corresponding to a number S of pixel-rows in the display panel; and

S≥2.

14. The driving method according to claim 13, wherein:

among effective pulse signals provided by the first type of control lines, a width of a single effective pulse signal is greater than or equal to 2H, and H is time required for scanning a row of sub-pixels in the display panel.

15. The driving method according to claim 11, wherein:

the second transistor and the third transistor are both low-temperature polycrystalline oxide transistors.

16. A display panel, comprising:

a light-emitting element and a pixel circuit connected to the light-emitting element, wherein:

the pixel circuit includes a first reset module, a data writing module, a compensation module, and a driving transistor;

a control terminal of the driving transistor is connected to a first node;

time for the display panel to display one frame includes N times of first node potential adjustment stages, a data writing stage, and at least one first bias stress stage performed before the light-emitting stage;

the data writing stage is after the N times of first node potential adjustment stages and before the first bias stress stage;

the first node potential adjustment stage includes N reset stages and N first adjustment voltage writing stages;

an i-th first voltage writing stage is after an i-th reset stage;

1≤i≤N, i is an integer, and N is an integer greater than or equal to two; and the display panel is driven by:

in the reset stage, turning on the first reset module, and writing a reset signal to the first node using the first reset module;

in the first adjustment voltage writing stage, turning off the first reset module, turning on the compensation module, and writing a first adjustment voltage into the first node to adjust a bias state of the driving transistor;

in the data writing stage, turning on the data writing module and the compensation module, and writing data signals using the data writing module;

in the first bias stage, turning off the compensation module, and writing a second adjustment voltage into a source or a drain of the driving transistor to adjust the bias state of the driving transistor; and in the light-emitting stage, generating a driving current to drive the light-emitting element to emit light using the driving transistor.

17. The display panel according to claim 16, wherein:

the pixel circuit further includes a storage capacitor, a light-emission control module and a second reset module, the data writing module includes a first transistor, the compensation module includes a second transistor, the first reset module includes a third transistor, the light-emitting control module includes a fourth transistor and a fifth transistor, and the second reset module includes a sixth transistor;

a first terminal of the driving transistor is connected to the second node, and a second terminal of the driving transistor is connected to the third node;

the second node is connected to a first voltage signal line through the fourth transistor, and the third node is connected to the fourth node through the fifth transistor;

two terminals of the light-emitting element are respectively connected to the fourth node and a second voltage signal line;

the storage capacitor is connected between the first voltage signal line and the first node;

the second node is connected to the data signal terminal through the first transistor;

two terminals of the second transistor are respectively connected to the first node and the third node, and the first node is connected to a first reset signal line through the third transistor;

two terminals of the sixth transistor are respectively connected to the second reset signal line and the fourth node;

in the reset state, the third transistor is turned on;

in the first adjustment voltage writing stage, the first transistor and the second transistor are turned on, and the first adjustment voltage is written into the first node through the data signal terminal;

in the data writing stage, the first transistor and the second transistor are turned on;

in the first bias stress stage, the first transistor is turned on, the second transistor is turned off, and the second adjustment voltage is written into the second node through the data signal terminal; and in the light-emitting stage, the fourth transistor and the fifth transistor are turned on, and the first transistor, the second transistor, the third transistor and the sixth transistor are turned off.

18. The display panel according to claim 16, wherein:

the pixel circuit further includes a storage capacitor, a light-emitting control module, a second reset module, and a voltage adjustment module, the data writing module includes a first transistor, the compensation module includes a second transistor, and the first reset module includes a third transistor, the light-emitting control module includes a fourth transistor and a fifth transistor, the second reset module includes a sixth transistor, and the voltage adjustment module includes a seventh transistor;

a first terminal of the driving transistor is connected to the second node, and a second terminal of the driving transistor is connected to the third node;

the second node is connected to a first voltage signal line through the fourth transistor, and the third node is connected to the fourth node through the fifth transistor;

two terminals of the light-emitting element are respectively connected to the fourth node and a second voltage signal line;

the storage capacitor is connected between the first voltage signal line and the first node;

the second node is connected to the data signal terminal through the first transistor;

two terminals of the second transistor are respectively connected to the first node and the third node, and the first node is connected to a first reset signal line through the third transistor;

two terminals of the sixth transistor are respectively connected to the second reset signal line and the fourth node;

two terminals of the seventh transistor are respectively connected to the second node and the voltage adjustment terminal;

in the reset state, the third transistor is turned on;

in the first adjustment voltage writing stage, the seventh transistor and the second transistor are turned on, and the first adjustment voltage is written into the first node through the voltage adjustment terminal;

in the data writing stage, the first transistor and the second transistor are turned on;

in the first bias stress stage, the seventh transistor is turned on, the first transistor and the second transistor are turned off, and the second adjustment voltage is written into the second node through the voltage adjustment terminal; and in the light-emitting stage, the fourth transistor and the fifth transistor are turned on, and the first transistor, the second transistor, the third transistor and the sixth transistor are turned off.

19. A display device, comprising:

a display panel, including:

a light-emitting element and a pixel circuit connected to the light-emitting element, wherein:

the pixel circuit includes a first reset module, a data writing module, a compensation module, and a driving transistor;

a control terminal of the driving transistor is connected to a first node;

time for the display panel to display one frame includes N times of first node potential adjustment stages, a data writing stage, and at least one first bias stress stage performed before the light-emitting stage;

the data writing stage is after the N times of first node potential adjustment stages and before the first bias stress stage;

the first node potential adjustment stage includes N reset stages and N first adjustment voltage writing stages;

an i-th first voltage writing stage is after an i-th reset stage;

$1 \leq i \leq N$, i is an integer, and N is an integer greater than or equal to two; and the display panel is driven by:

in the reset stage, turning on the first reset module, and writing a reset signal to the first node using the first reset module;

in the first adjustment voltage writing stage, turning off the first reset module, turning on the compensation module, and writing a first adjustment voltage into the first node to adjust a bias state of the driving transistor;

in the data writing stage, turning on the data writing module and the compensation module, and writing data signals using the data writing module;

in the first bias stage, turning off the compensation module, and writing a second adjustment voltage into a source or a drain of the driving transistor to adjust the bias state of the driving transistor; and in the light-emitting stage, generating a driving current to drive the light-emitting element to emit light using the driving transistor.

* * * * *